United States Patent
Ortiz et al.

(10) Patent No.: US 11,893,597 B2
(45) Date of Patent: Feb. 6, 2024

(54) SYSTEM AND METHOD FOR LOADING SECURE DATA IN MULTIPARTY SECURE COMPUTING ENVIRONMENT

(71) Applicant: ROYAL BANK OF CANADA, Toronto (CA)

(72) Inventors: Edison U. Ortiz, Orlando, FL (US); David Ian Mckay, Toronto (CA); Christoph Knoess, Sag Harbor, NY (US); Seung Bong Baek, Toronto (CA); Ravi Khandavilli, Orlando, FL (US); Adel Al Nabulsi, Toronto (CA); Arnold Badal-Badalian, Toronto (CA); Justin Simonelis, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 0 days.

(21) Appl. No.: 17/746,926

(22) Filed: May 17, 2022

(65) Prior Publication Data

US 2022/0300999 A1    Sep. 22, 2022

Related U.S. Application Data

(63) Continuation-in-part of application No. 17/701,612, filed on Mar. 22, 2022.
(Continued)

(30) Foreign Application Priority Data

Mar. 22, 2022    (WO) .............. PCT/CA/2022/050430

(51) Int. Cl.
*G06Q 30/00*    (2023.01)
*G06Q 30/0207*    (2023.01)
*H04L 9/40*    (2022.01)

(52) U.S. Cl.
CPC ....... *G06Q 30/0224* (2013.01); *H04L 63/083* (2013.01)

(58) Field of Classification Search
CPC .................... G06Q 30/0224; H04L 63/083
See application file for complete search history.

(56) References Cited

U.S. PATENT DOCUMENTS

| 7,899,706 B1 * | 3/2011 | Stone ................. G06Q 30/0269 705/14.54 |
| 7,930,252 B2 | 4/2011 | Bender et al. |

(Continued)

OTHER PUBLICATIONS

Fatema, K.,. Adding Privacy Protection to Policy based Authorisation Systems, University of Kent, ProQuest Disserations Publishing, 2013 (Year: 2013).*

(Continued)

*Primary Examiner* — Matthew L Hamilton
(74) *Attorney, Agent, or Firm* — Norton Rose Fulbright Canada LLP

(57) ABSTRACT

A computational approach is proposed herein for controlling a user interface for rendering of interactive graphical control elements representing offers and coupons that are inserted into a computational payment process. In particular, the offers and coupons can interact with stored payment information resident (or tokens thereof) on a digital wallet data structure. The approach can be implemented as a computing system, a computing method operable on a computing system, or a computer program product affixed in the form of a non-transitory computer readable medium storing machine-interpretable instructions.

20 Claims, 20 Drawing Sheets

Related U.S. Application Data

(60) Provisional application No. 63/189,611, filed on May 17, 2021, provisional application No. 63/164,444, filed on Mar. 22, 2021.

(56) References Cited

U.S. PATENT DOCUMENTS

| | | | |
|---|---|---|---|
| 9,560,014 | B2 | 1/2017 | Grobman et al. |
| 10,552,863 | B1 | 2/2020 | Sadagopan et al. |
| 11,593,506 | B2* | 2/2023 | Lilly ................. G06F 16/24524 |
| 2012/0166268 | A1 | 6/2012 | Griffiths |
| 2013/0177170 | A1 | 5/2013 | Coppinger |
| 2013/0191223 | A1 | 7/2013 | Harris et al. |
| 2013/0246141 | A1* | 9/2013 | Liberty .............. G06Q 20/3223 705/14.17 |
| 2015/0073863 | A1 | 3/2015 | Malgatti et al. |
| 2015/0332311 | A1 | 11/2015 | Patel et al. |
| 2016/0105402 | A1 | 4/2016 | Soon-Shiong et al. |
| 2017/0323029 | A1 | 11/2017 | Rissanen |
| 2018/0096166 | A1* | 4/2018 | Rogers .................... H04L 63/04 |
| 2019/0347443 | A1* | 11/2019 | Mandal ................. G06F 16/221 |
| 2019/0362083 | A1 | 11/2019 | Ortiz et al. |
| 2020/0014691 | A1 | 1/2020 | Ortiz et al. |
| 2020/0097574 | A1* | 3/2020 | Hay .................. G06F 16/24561 |
| 2020/0177604 | A1* | 6/2020 | Wei ....................... H04L 9/3234 |
| 2020/0401708 | A1* | 12/2020 | Friedman ........... G06F 21/6245 |
| 2021/0165786 | A1* | 6/2021 | Halstead ........... G06F 16/24544 |
| 2022/0050915 | A1* | 2/2022 | Hsy ........................ G06F 9/547 |
| 2022/0358239 | A1* | 11/2022 | Borsato ................... G06F 21/40 |
| 2022/0414255 | A1* | 12/2022 | Wang ................. G06F 21/6245 |
| 2023/0058906 | A1* | 2/2023 | Jansen ................ G06F 21/6227 |

OTHER PUBLICATIONS

Priebe, C. et al., "EnclaveDB: A Secure Database using SGX", 2018 IEEE Symposium on 5-7, 15-17 Security and Privacy (SP), May 24, 2018 (May 24, 2018), pp. 264-278, ISSN 2375-1207 [online] [retrieved on Apr. 6, 2022 (Apr. 6, 2022)]. Retrieved from the Internet: < DOI:10.1109/SP.2018.00025>.

Canadian Intellectual Property Office (CIPO), International Search Report and Written Opinion for PCT/CA2022/050430, dated Apr. 27, 2022.

Kolter et al., "A Privacy-Enhanced Attribute-Based Access Control System". IFIP Annual Conference on Data and Applications Security and Privacy, DBSec 2007: Data and Applications Security XXI, Lecture Notes in Computer Science, Jul. 8, 2007 (Jul. 8, 2007), vol. 4602, pp. 129-143, DOI: https://doi.org/10.1007/978-3-540-73538-0_11[online] [retrieved on Nov. 3, 2021 (Nov. 3, 2021)]. Retrieved from the Internet: <https://link.springer.com/chapter/10.1007/978-3-540-73538-0 II#citeas>.

Canadian Intellectual Property Office (CIPO), International Search Report and Written Opinion to PCT/CA2021/051273, dated Dec. 7, 2021.

Canadian Intellectual Property Office (CIPO), International Search Report and Written Opinion to PCT/CA2021/051272, dated Dec. 1, 2021.

Canadian Intellectual Property Office (CIPO), International Search Report and Written Opinion to PCT/CA2021/050779, dated Aug. 17, 2022.

* cited by examiner

1200

Inspired by your search history

8% Cashback    5% Cashback    2x Points    1.5x Points

FIG. 12

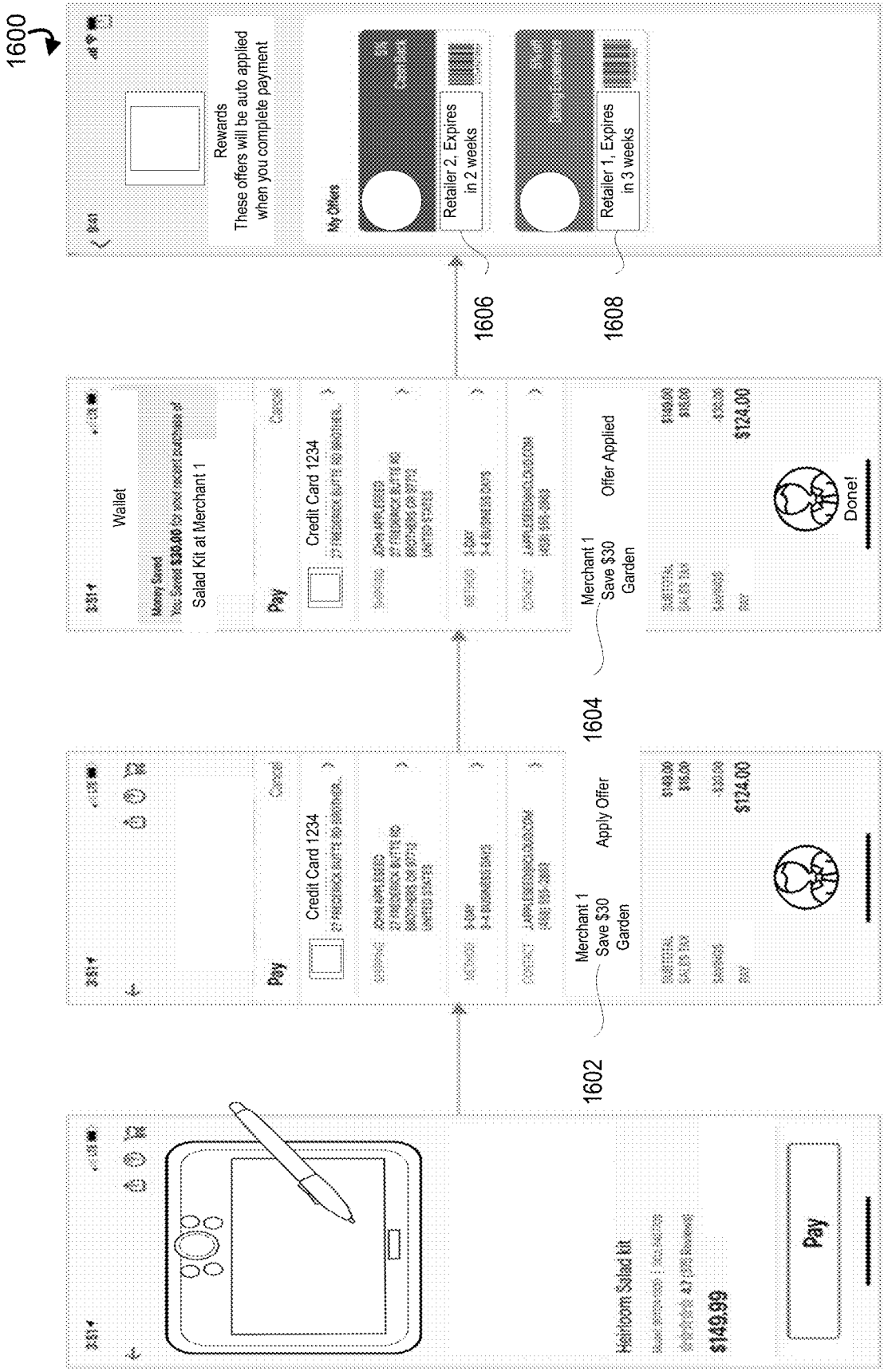

SYSTEM AND METHOD FOR LOADING SECURE DATA IN MULTIPARTY SECURE COMPUTING ENVIRONMENT

CROSS REFERENCE

This application is a continuation in part of, U.S. application Ser. No. 17/701,612, dated 2022 Mar. 22 and entitled SYSTEMS AND METHODS FOR ESTABLISHING DATA LINKAGES which is a non-provisional of, and claims all benefit, including priority to, U.S. Application No. 63/164,444 dated 2021 Mar. 22 and entitled SYSTEMS AND METHODS FOR ESTABLISHING DATA LINKAGES, incorporated herein by reference in its entirety.

This application claims priority to PCT Application, PCT/CA2022/050430, filed 2022 Mar. 2, entitled SYSTEMS AND METHODS FOR ESTABLISHING DATA LINKAGES, incorporated herein by reference in its entirety.

This application is a non-provisional of U.S. Application No. 63/189,611, dated 2021 May 17, and entitled SYSTEM AND METHOD FOR LOADING SECURE DATA IN MULTIPARTY SECURE COMPUTING ENVIRONMENT, incorporated herein by reference in its entirety.

FIELD

Embodiments of the present disclosure generally relate to the field of computerized prediction generation, and more specifically, embodiments relate to devices, systems and methods for establishing data linkages for use in provisioning offers and coupons, and operating privacy-enhanced offer and coupon campaigns.

INTRODUCTION

Generating computerized predictions is challenging when different data sets are stored in disparate data storage by disparate parties, each having their own data security and data privacy obligations.

Privacy is an increasing concern for users, and previously available solutions, such as "advertising/tracking cookies", such as HTTP cookies representing metadata placed on a user's computer for tracking purposes are becoming unpopular, both among users and regulatory bodies, as in the past, users had practical challenges providing informed consent.

In an effort to protect customers, increased scrutiny of "cookies" based approaches has led to restrictions on their availability and usage. However, existing implementation of "cookies" based approaches are fragmented in their approach to adhering to user consent opt-ins/opt-outs, and it is practically very challenging for users to determine and/or manage their consents once given (e.g., accidentally through a mis-click of a button on a "cookies consent banner" widget surfaced on a website). An alternative to "cookies" is proposed herein using a privacy enhanced computing architecture.

SUMMARY

A computational approach is proposed herein for controlling a user interface for rendering of interactive graphical control elements representing offers and coupons that are inserted into a computational payment process. In particular, the offers and coupons can interact with stored payment information resident (or tokens thereof) on a digital wallet data structure. The approach can be implemented as a computing system, a computing method operable on a computing system, or a computer program product affixed in the form of a non-transitory computer readable medium storing machine-interpretable instructions.

The increased digitization of coupons and offers provides an opportunity to improve the provisioning of coupons and offers to users, however, non-trivial technical problems arise in relation to computer implementation of coupons and offers, especially when establishing automated mechanisms established to protect and enhance aspects of data sharing of sensitive data.

Earlier computational approaches, such as using metadata trackers in the form of tracking and third party cookies, have led to a leakage of user information, and a proliferation of user privacy issues. Typically, users have little control and knowledge over the information stored in cookies, and furthermore, companies tracking information using cookies have also had limited control over access to information that they are also privy to and seek to protect on behalf of the user.

In particular, additional technical mechanisms are proposed for enhancing the privacy of users such that offer targeting and campaigns can be conducted by various parties without access to the underlying data of users.

A computational architecture is described where user information that is stored, in various database tables, in an always protected data storage mechanism (VCR). The always protected data storage mechanism stores user data tables having limited access rights and capabilities, and enforces these through automated processes (e.g., daemons) that can, for example, limit the types of queries and/or query responses requiring cross-table connections (e.g., joins).

Queries, for example, can be limited to queries that do not yield specific outputs corresponding to one or a small number of users, or can be limited to queries such as counts, or an overall holistic score associated with a group of characteristics where the holistic score cannot be easily unwound to identify the constituent values. Queries for sensitive data fields can also be transformed or limited in their output (e.g., while the data table may have actual addresses, the query can only interact with an obfuscated or less precise version of the actual addresses, such as postcodes, proximity regions). Consent can be validated for each and every query through comparing against a consent field present in a database field or, in some embodiments, in a global user database, such that user consent can be readily verified and/or given or revoked by the user, propagating across for all future query responses.

In some embodiments, the query responses are utilized to update a database record corresponding to the users stored on the always protected data storage that is not accessible by queries from merchant or advertising users. For example, a merchant or advertising campaign may identify characteristics of a target audience for a particular offer or coupon or other promotion, and while the system can be used to target these users to present the offers, coupons, or other promotion, the merchant or advertising campaign may have limited or no access to the list of users that were identified as targets. Accordingly, users can be further protected such that the provision of offer, coupon, or other promotion information can be provided in a one-way push, with tracked feedback potentially limited to whether a user has interacted with or used the provisioned offer, coupon, or other promotion information.

It is important to provide a robust mechanism for audience generation that adheres strictly to user consent as the user information may be collected by various parties in separate data repositories, and the information may be sensitive to the parties. As described, the always protected data storage mechanism limits the types of query interactions such that the campaigns are unable to obtain access to information that is not necessary for the campaign. This is important for providing a cross-party solution where cross-party data could otherwise be potentially used maliciously, and provides a cross-data set solution between parties having differing levels of technical sophistication and available computing infrastructure. The always protected data storage mechanism serves as common infrastructure for which the parties are able to load their data for increased analytics (e.g., having access to the otherwise silo-ed data of other parties) while providing additional safeguards for adhering to user consents and privacy.

A number of different variations are proposed in respect of how the system components interact together to determine when targeted offers are pushed.

In a first embodiment, the data elements are loaded as individual data tables corresponding to each of the participating data sources into the always protected data storage. These participating data sources can include insurance companies, financial institutions, merchants, loyalty/reward programs, among others, and the data elements can include user data, product data (e.g., SKU-level data), pricing data, inventory data, among others. By loading the data into the always protected data storage, the data becomes accessible in aggregate by the always protected data storage.

The always protected data storage can be interacted with using a campaign computing interface (e.g., an advertising campaign computing interface), which is configured to provide query requests to the always protected data storage to obtain query responses or to update a user table or a campaign table stored on the always protected data storage with flagged users or candidate transactions (if the audience list is configured not to be made available to the original requester). The query request can be provided through a graphical user interface, such as a web-based advertising campaign control platform, or through a command line interface, or through an application programming interface (API) with exposed functions. The query request message can, in some embodiments, include various consents from users, or consents from data sources to access the protected data tables.

The always protected data storage system receives the query request message and processes the message by first validating the query request message, loading the relevant database tables into memory, and then running the query across the relevant database tables or a combination thereof, for example, combined using various types of JOIN commands. In some embodiments, the query request messages are run in batch (e.g., the tables are loaded and then a large volume of queries are run), while in other embodiments, the query request messages can be run ad-hoc. In a variation, the query response itself can also be processed for validation as a second safety mechanism to ensure that the query response also adheres to various restrictions for user privacy/consent. For example, an optional post-processing validation step can be used to ensure that no sensitive information, such as actual addresses, ages, names, etc. are exposed in the query response.

The query request can include Boolean statements or logical criterion, and in some embodiments, can also include a score-based query. For example, a number of criterion can be associated with different score contributions, and users having a contribution score greater than a threshold are identified and/or flagged as potential audience members for an audience list for the campaign.

In an alternative, the query response itself is used to flag user accounts that match the criterion in a query request, as opposed to providing identifiable responses, and the query response itself simply indicates that internally within the always protected database, the corresponding users have been flagged (without responding with any identifiable information). In this example, the flagged accounts can be interacted with through the always protected database system, for example, in a push approach where coupons and offers are pushed to those users without the marketing or merchant computing systems ever having access to the identities or contact information of those users, or a pull approach where when corresponding users interact various triggering actions on a website or a mobile application, the interaction causes the rendering of an offer or coupon, or other promotional item.

Different triggering conditions are possible, but in an example a trigger could occur, for example, when the user is in a checkout state on a website (e.g., as obtained probabilistically or deterministically by parsing the URL) or when the user is accessing stored checkout details, such as card information stored in a digital wallet or in a wallet mobile application.

A feedback loop may established to help train a machine learning model based on tracked intents and actual purchase outcomes, including offer and/or coupon uptake and interactions.

The system can be implemented as a physical computing appliance, such as a dedicated server residing in a data center, coupled across various networks, such as the internet, to data sources of various third party partners. Query requests can be received alongside consent information in the form of data messages across a message bus, to be processed by the system using an always protected database loading mechanism. The always protected database may be configured to restrict access and/or delete combined or derived data following usage or query completion.

The system outputs may be utilized to control a graphical user interface or a website content management system to render or otherwise surface one or more interactive visual interface elements representative of offers, coupons, or other promotional materials. These interactive visual interface elements can be inserted in the form of widget bars, radio buttons, checklists, etc. The system outputs, for example, can include audience lists, updated data tables, new data tables, among others.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 12 is an example rendering of a next merchant display rendering, according to some embodiments.

FIG. 16A, FIG. 16B, FIG. 16C, and FIG. 16D are screenshots showing an example coupon or offer redemption process flow where an offer for an example heirloom salad kit is being applied and ultimately redeemed, according to some embodiments.

FIG. 18 is a more complex example relative to FIG. 17 showing a number of trusted execution environments controlling access to a plurality of underlying secured database tables, according to some embodiments.

DETAILED DESCRIPTION

Figure 1:
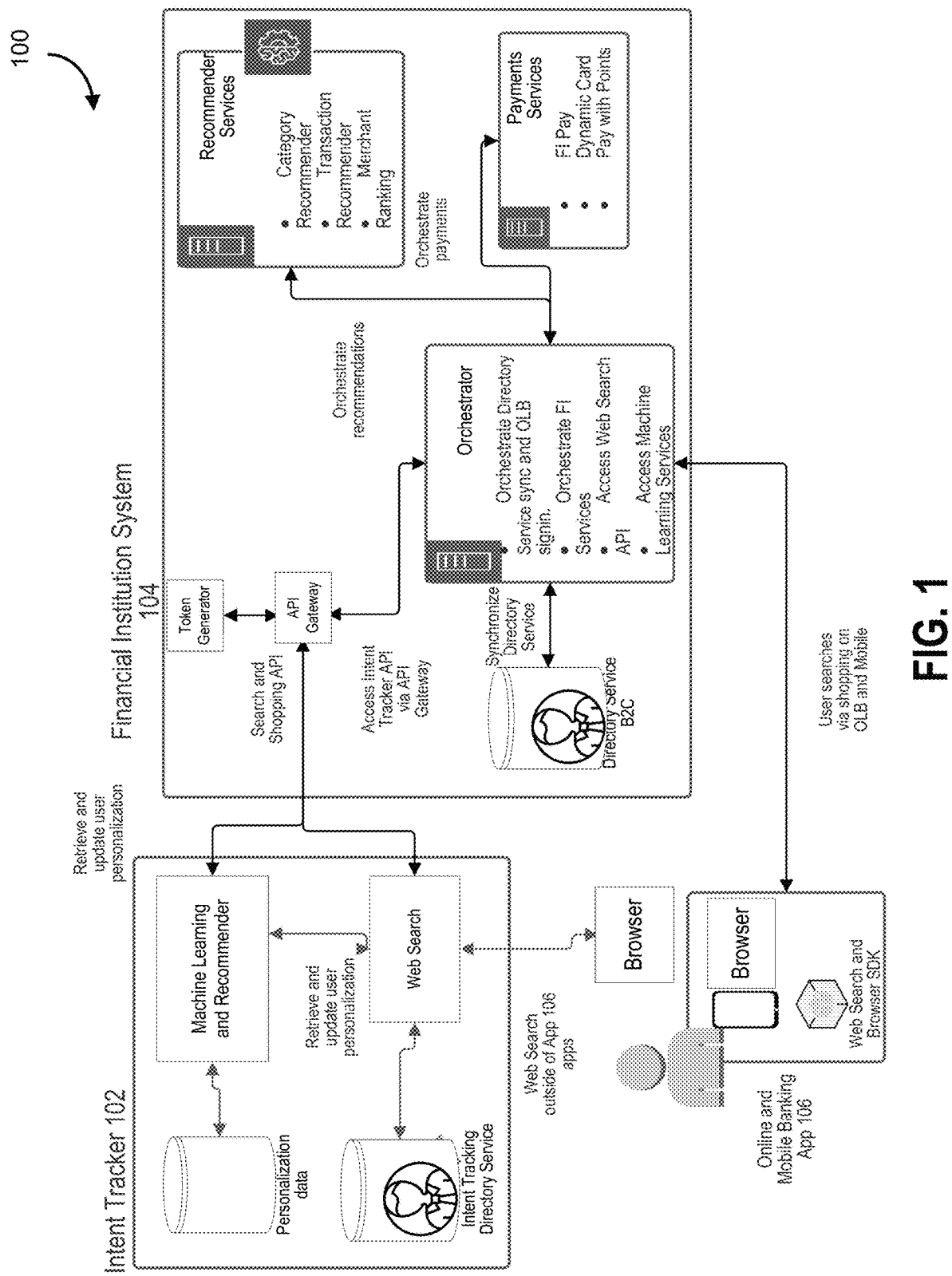
FIG. 1 is a block schematic diagram of an example data process linkage system, according to some embodiments.

The increased digitization of coupons and offers provides an opportunity to improve the provisioning of coupons and offers to users. In particular, approaches, systems, methods, and corresponding non-transitory computer readable media (having instruction sets stored thereon for execution by a processor) described herein are adapted to providing improved interactive tools for interacting with, redeeming, and/or tracking the usage of digital coupons or offers that can be integrated with an improved level of privacy and process efficiency related to other approaches.

Digital coupons and offers are utilized by companies to improve awareness of their products, and different approaches are utilized to allow for the provisioning of and ultimately, the redemption of the coupons and offers. Coupons and offers aid in encouraging or maintaining purchasing behaviour across temporal dimensions—for example, a user may "clip" or otherwise attach a coupon or an offer for later usage by having it saved or associated with the user's account, and the user may later apply this coupon or offer in a later transaction. Coupons and offers, in some implementations, can be coupled with undesirable behaviour trackers that a user may not be aware of, such as tracking cookies, unique URLs, among others, which can leak personal information about the user in the context of the purchasing transaction.

An improved approach is described herein that utilizes a combination of privacy-enabling technologies to aid in the technical provisioning of a digital payment workflow whereby coupons and offers can be generated and associated with user accounts without necessarily exposing more information than is necessary or is consented to by the user during provisioning or the redemption step.

A digital offer or coupon is made available to a user (e.g., through an interactive control element that the user interacts with, or pushed out to automatically to an audience of users), and the digital offer or coupon is then loaded onto a data structure representative of a digital wallet of the user.

At a later time, such as when the user decides to make a purchase, the presence of the offer or coupon can be re-surfaced (e.g., rendered onto a corresponding display of a user interface) such that the user is able to observe that a price or quantity (or other characteristic of the transaction) is modified if they choose to apply the coupon or offer.

During the payment transaction itself, the user may select to apply the coupon or offer (or it may be automatic in some embodiments), and the reduced price/improved offer is automatically provisioned during the payment step, such that the price ultimately charged to the user or the user's account by an issuer is reflective of the reduced price/improved offer without having to undertake the inconvenience or additional processing required with after-the-fact type redemption tracking, such as affiliate links, statement credits, among others.

The approach is implemented on computing components, including computing systems and computer processors/servers that provide a digital payments backend to support payment transactions that can take place across a diversity of different payment mechanisms, such as in-store payments, web-based payments, and in-app payments, among others.

To ensure privacy as between the storing of the coupons and offers and the redemption thereof, "virtual clean room" type trusted execution environment back ends can be utilized for storing and processing sensitive information, such as audience lists for particular campaigns, the specific coupons or offers that are associated with various wallets, and the redemption status of the coupons or offers. This is particularly important where the "virtual clean room" type trusted execution environment is configured to aggregate data sets from multiple data sources together that do not trust one another or cannot trust one another for generation of the target audience list (e.g., the audience list is generated from a JOIN operation from two database tables from separate entities), or where there are privacy considerations where a user cannot or should not be tracked between sessions.

The "virtual clean room" type trusted execution environment in this example provides an "always protected database" mechanism can be configured to interoperate with merchants and offer tracking systems to obtain a list of merchant store keeping unit (SKU) level transactions, which can then be utilized for offer campaign provisioning through the pushing of coupons and offers to user devices for later use, including targeted offers.

The always protected database is a computational mechanism that restricts access to data accessible from or stored thereon.

Queries are received by the always protected database and are validated for adherence to policy requirements of the always protected database, and these policy requirements can be field level (e.g., social insurance numbers, addresses, names, post codes), data value level (e.g., celebrity/VIP address), or source level (e.g., insurance companies may implement a strict privacy regime). Query validation can include restricting the query to only a few pre-approved query types made available in the interface, or in some embodiments, automated approaches to validate queries to ensure that sensitive information is never returned or exposed as part of the query response.

Policy requirements may also be associated with individual rows of the database associated with particular users, etc., and in some embodiments, each of the policy requirements can range from obfuscation requirements (e.g., can never be returned as an actual value, only can be returned as a count, or can only ever be returned in groups of >50 results with the identifier field never being shown), consent requirements (e.g., a signed data object or a key is required to be adduced alongside the query to obtain this information), among others.

In the always protected database, a plurality of data tables are available from the various sources, and during query processing, the always protected database loads at least two of the data tables from different entities together and combines them together for a cross-table analysis. The combination can include a logical JOIN command, among others, and various permutations and combinations thereof of query commands. The JOIN command can include the use of a shared related column that is used as a primary or a foreign key, and as described in various embodiments here, the primary key need not be the same for every query operation between two tables. For example, two tables of incomplete information from two separate parties may alternate between different fields being used as primary keys in an attempt to address various gaps resulting from the incomplete information. Various types of joins are possible, such as LEFT JOINs, RIGHT JOINs, INNER JOINs, and OUTER JOINs.

When the tables are combined together, query commands can be used on the combined table, such as conducting selections, counting, comparisons, among others, and these query commands can be utilized to represent elements of logical conditions which are utilized to identify particular records to be counted or selected for output, etc.

The combined table can be analyzed together in responding to the query, for example, searching vehicle purchase data table alongside an insurance payout data table to help a researcher confidentially identify liability statistics for a particular type of minor fault with the vehicle during manufacturing. In another use case example, with the consent of certain parties encapsulated alongside the query message in the form of cryptographic keys or cryptographically signed messages, a class-action lawsuit payout can be initiated for specific parties using information from the vehicle purchase data table alongside the insurance payout data table. In this example, specific consent can be provided and obtained, and the existence and usage of the cryptographic keys can be used in future audit situations to demonstrate that the information was only made available in accordance with user consent (e.g., to help establish that a payout should occur to assist the parties of the class action lawsuit with the required repairs).

The query can be received from a campaign management process, such as an advertising campaign management process, an insurance payout management process, a research campaign management process, among others, and these can be provided in the form of Javascript object notation (JSON) messages, extended markup language (XML) messages, among others, or query language messages, indicating the set of logical conditions, and/or the type of response output requested from the system.

The request output from the system is a field that can control whether the campaign process is seeking to obtain a specific response (e.g., research campaign asking to provide count of all purchasers of washing machine SKU 111992948 in post code 90210, countOf users=29), or if the campaign process is seeking to generate an audience list data structure.

If generating an audience list data structure, in some embodiments, the campaign process may receive the audience list data structure potentially identifying the relevant users identified for a particular campaign (e.g., a municipality environmental campaign seeking addresses of all purchasers of washing machine SKU 111992948 in post code 90210, to inform them of a promotion to replace their washing machines with eco-friendly alternatives), or in another embodiment, the campaign process generates an audience list that is maintained on the always protected database but not accessible to the campaign process.

This alternate embodiment can be used for advertising campaigns where user privacy is maintained in a one-way communications approach whereby the system can be triggered to automatically send messages, communicate, push digital elements (e.g., offers, coupons) into digital wallets (e.g., a digital coupon book) or render visual interface control elements injected into a checkout process, into rendered advertisements, or coupons and offers visual control elements that can be interacted with to apply various discounts, show various information elements, among others. In the one-way audience list variation, privacy is further enhanced as the campaign process does not receive access to the audience list but rather, the audience list is either used for push or pull interactions initiated by the user actions for communications between the always protected database and the user's device.

During a checkout session, a user's purchase interaction may utilize a digital payment mechanism that is coupled to an issuer computing device that requires approval from the issuer computing device. As part of the data process supporting the user's purchase interaction, the "virtual clean room" type trusted execution environment may be interacted with to check whether there is a valid offer or coupon to be processed, and if it is determined to be a valid offer or coupon, the "virtual clean room" type trusted execution environment may send a data message to the issuer computing device to modify the transaction such that the price ultimately paid is reduced or modified in accordance to the offer or coupon. In this example, the interjection from the "virtual clean room" type trusted execution environment occurs at the issuer payment processing operation, obviating a need to conduct post-processing to map transactions to offers and coupons.

In another embodiment, the trusted execution environment includes a plurality of secure database tables that are loaded with user data from a plurality of data sources loaded and encrypted in accordance with a set of digital security permissions, and the trusted execution environment is configured to validate, using a data custodian data process, processing of the eligibility query data message to ensure adherence to the set of digital security permissions. The digital security permissions, for example, can include limitations on access rights, query responses, among others, and can be unlocked, for example, with the provisioning of a corresponding encryption key for access (e.g., from a merchant device or from a user).

The trusted execution environment is configured for a comparison of whether the user trying to redeem a digital offer or a coupon corresponds to one or more targeted users identified in the plurality of secure database tables. The one or more targeted users can be identified through a query operation of a user list that is provided on one or more secure database tables.

For example, a number of different organizations may provide separate user lists and a JOIN operation can be used to identify an intersection of users who should be provided a particular digital offer or coupon (e.g., University students in their first year of a co-operative program who also have not yet opened a tax-free savings account and have more than $500 in a low-interest savings account—database tables can, for example, be from the University enrollment records, and a financial institution (e.g., a bank)'s user account records).

The validation may occur at different points in a digital transaction processing data process, for example, the validation step may occur when the digital offer or coupon is being loaded onto a digital wallet of the user (e.g., coupled to the user's mobile device in a secured element thereon), or during redemption of the digital offer or coupon, or at both times.

FIG. 1 is a block schematic diagram of an example data process linkage system, according to some embodiments. The data process linkage system 100 is adapted for an eCommerce platform having improved capabilities in linking data representations of intents and data representations of outcomes, such that a computer processor can transform data sets representing offers and/or promotions based on tracked data linkages. The system 100 is a network linked system having an intent tracker system 102, a financial institution system 104, and an online and mobile banking application 106, which can be separate computing systems whose operations are orchestrated together by the financial institution system 104. The network can include a local area network, or a wide area network, such as the Internet.

The data process linkage system is utilized as an input into an always protected database, such as the virtual clean room as described herein. The data process linkage system is utilized to receive, for example, through a connected web browser or web search SDK, a user's browsing history, returned websites, sent queries, and/or other interaction information, and enter into the always protected database either the raw data or a transformed version thereof. For example, a user data table can be populated with the user's queries, extracted elements from the response pages indicative of the user's browsing/navigation history, among others. In another embodiment, the user data table is populated instead with derivative data derived from the user's raw data, such as a user profile indicative of particular search trends, demographic information, preferred usage channel (e.g., smartphone browser, mobile application, desktop browser), among others. In another embodiment, the user data table includes both raw and transformed data.

The user data table can include specific consent fields that can be coupled to particular rows, fields, or the entire data table. These consent fields can include a consent key, a signed message requirement, among others. The consent fields, in an example, can be coupled with privacy policies such that, for example, with consent, the entirety of the user data table can be returned as a response result, or without consent, the user table can only be used for aggregated data or one-way push audience lists only, among others. Variations are possible. The consent field can include a value for a cryptographic key to be provided, which, can include a private key corresponding to a stored public key in the field. An example table is provided below.

| StudentID | Student Name | Graduation Year | Academic Average | Consent Public Key |
|---|---|---|---|---|
| 246649491 | John SMITH | 2022 | 85.4 | 5d41402abc4b2a76 |
| 992242471 | George SMITH | 2023 | 91.1 | b9719d911017c592 |

In another embodiment, the consent field includes a public key, and when a consent is to be provided, a digitally signed message (using the corresponding private key) is required to be sent which can then be validated using the public key. This is useful, for example, where the user or the user's device maintains the private key and avoids exposing the private key.

To interact with this data, the system may be configured to require a message with the studentID be encrypted using the student's corresponding private key before allowing access to sensitive information, such as the user's academic average. However, the user's graduation year, on the other hand, may be accessible without the private key.

Figure 2A:
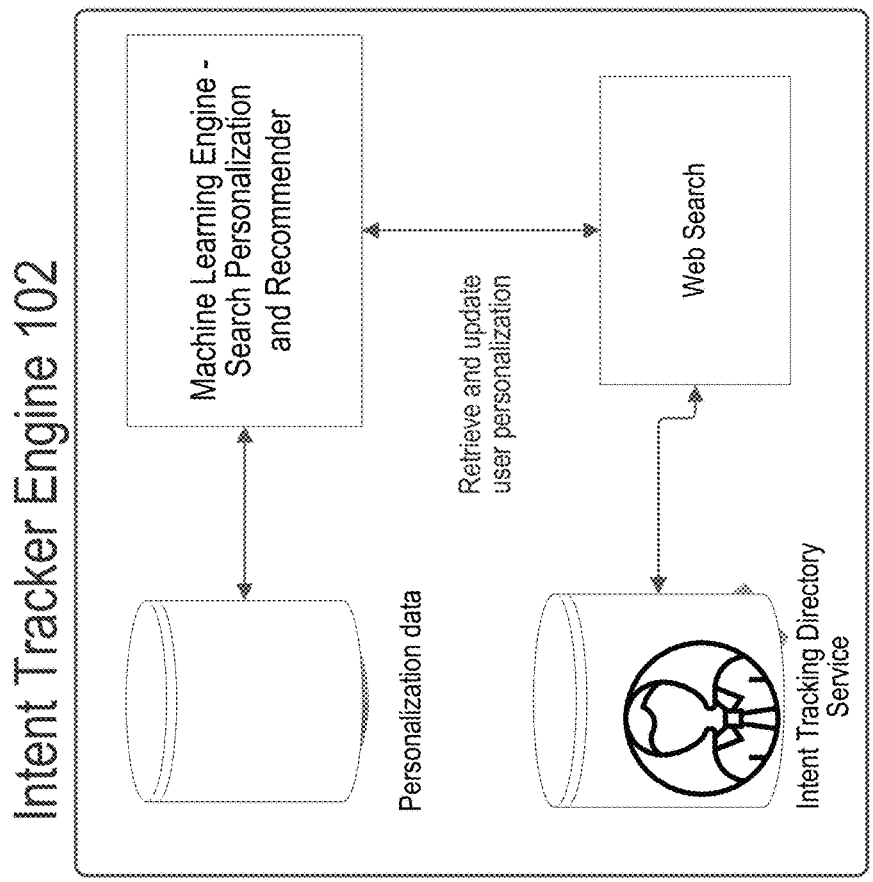
FIGS. 2A-2C are block schematic diagrams showing portions of the data process linkage system in more detail.

An intent tracker system 102, shown in more detail at FIG. 2A, is provided that generates a first data set representative of intents, and this information can be tracked by way of web search query history, internet set browse/traversal history, entered keystrokes, trackable aspects of various eCommerce gateways (e.g., data objects representing specific products/services included in a shopping cart), among others. The user may be able to log in using the user's credentials, and the first data set can thus be associated with the user through, for example, an account associated with a user profile (e.g., stored in an intent tracking active directory).

Web search history can be obtained, for example, through monitoring URL activity or HTTP messaging, such as GET/POST information for variable extraction, among others. Responses from websites can also be processed to obtain this information, for example, responses to queries sent, specific links clicked that indicate a particular browsing path, etc.

In a specific example, web search history can include a search for "best graphics card for playing games", "best graphics card under $1000", "promo code 3080 ti", "3080 ti review", "graphics requirements to play latest flight simulator", and "what is ray tracing". Each of these queries can be tracked as a character string or a set of tokenized words. The user may also be navigating pages, and the navigation through the webpages can be tracked through "a href" links, as well as the response pages through http document structures that can be obtained through a dom tree analysis. The user's navigation (both inputs and http responses) can thus be utilized to add additional intent inputs that can be provided in the form of strings.

For example, navigation inputs can include "in store pick up", "shipping costs", "Waterloo, ON location store hours", "graphics cards", on a retailer site, or for a retailer website, or on a review site "best graphics cards for a budget", "upgrade pick", "budget pick", among others. The navigation inputs can be obtained through the URLs that a user is traversing, or intercepting source http responses and processing them to extract information from header or body portions.

Metadata relating to the sites themselves can also be included as intent inputs, for example, obtained through extracting the domain or IP address that a message is being sent to (www.retailer1.com/q?=graphicscards), among others.

These intent inputs can be characterized as separate inputs and associate with the user through a primary key associated with the user based on the user being logged in to improve relevancy, for example. The primary key may be stored in the user's profile, and can include a user number, user identifier, etc. In some embodiments, the primary key can be changed from time to time to enhance privacy, and the primary key is known only by the user and the user's device, and can for example be stored on a secure partition or other secure computing element such that the primary key cannot be used for other purposes. In some embodiments, the underlying intent inputs are purged after processing for extraction of input features to further enhance user privacy. As described below, in some embodiments, semantic expansion can be used to add additional inputs for machine learning, expanding the set of available features at the cost of performance and storage in the machine learning model that may be maintained over time in the user's profile.

These intent inputs may be semantically enhanced in some embodiments, especially if the amount of intent inputs are limited. Semantic enhancement includes introducing semantic variants to replace and/or augment the intent inputs. For example, a search for "Disney" could include replacing with variants based on the most popular related search terms, such as "Disney vacation", "Orlando travel", as determined based on semantic similarity and/or popularity with other users, for example. In some embodiments, the "tightness" of the semantic expansion (e.g., based on constraining parameters) could be iteratively reduced if not many offers (e.g., less than a pre-defined number) are ultimately surfaced by the system so that the number of offers shown is below a certain amount of offers, to avoid presenting an empty list of offers.

The user's profile may be associated with personalization data, and the intent tracker system 102 may be configured to generate an initial set of offers and/or promotions. The promotion data object can include a prioritized list or an array of potential purchases. For example, a user may be seeking to buy a new computer, and is searching specific components to be purchased separately (e.g., RAM, power supply), in one or more transactions (e.g., at different stores). Offers and promotions can be associated with machine learning/personalization rewards and penalties, and when they are interacted with or selected, an interaction data representation can be obtained for processing potential outcome features for an outcome feature set. The set of outcome features can then be re-processed to tune the linkage representations between the intents and outcomes to update a model representation for the user.

Initially, as the intent tracker system 102 does not have access to outcome information (e.g., whether the user actually went through with a purchase, or purchased through other purchasing portals), the initial set of offers and/or promotions may be poorly tailored, obsolete, or irrelevant (e.g., surfacing a promotion for an item that the user has already purchased in store).

Offers can be presented without an actual query, based on an imputed query based on the user's profile (e.g., estimating a next query based on past queries and outcomes). In another variation, offers can be presented based on a specific query of offers (e.g., the user searches offers relating to "Disney").

The offers can be presented in the form of rendered advertisements, or through other approaches such as a modification in an order of search results to improve relevance to the user's query beyond the word tokens in the query (e.g., using the personalized information from the user's profile). From a computational perspective, the rendered advertisements can be represented using data, variables, and string representations of the advertisements, such that various features of the advertisements are also tracked as features. For example, an advertisement may have associated retailer features (e.g., a stringRetailer, or numberRetailerID), channel features (e.g., isMobile, isDesktop, isInStore), and these features may be provided, for example, in different variable types, such as strings, characters, values, integers, among others. Additional features may include the level of discount (e.g., percentDiscount=5%, 10%, 15%, isBuyOneGetOneFree), the types of products relating to the discount (e.g., electronics, computer), among others.

Offers can also be presented in the form of coupons and offers that reside on or are coupled to a digital wallet of the user, such that when the user's session transitions to a checkout state or shows specific information relating to a particular item (e.g., as identified by SKU) or merchant, a coupon or offer is automatically shown on the screen as an interactive visual interface element, and when interacted with, the coupon or offer is applied such that the checkout process can reflect a new or updated price.

Offers and coupons can be generated based on a push basis (e.g., all users on the audience list who has given consent to be provided offers and coupons automatically have them loaded into their corresponding digital wallets automatically), or on a pull basis (e.g., all users when entering a checkout process or a browsing process showing individual SKUs will ping the always protected database with a request to check if the user is on the audience list, and if so, then the offer and coupon may be shown to the user. In another embodiment, when the user enters the checkout state or a browsing state, only then is the always protected database queried to validate if the user meets the set of logical conditions for the offer (e.g., weightedOfferScore>=50).

The offers can be dynamic for each user, for example, based on a targeted audience that is developed for a particular campaign. For audience matching, in some embodiments, aspects of the user's profile can be used to create a tailored selection of users. For example, a campaign may be targeting users who appear to be interested in graphics cards, be in a 20-35 age range, have searched "graphics card reviews", while having profiles linked to their social media services.

These aspects can be combined together as weighted score elements such that the audience only consists of those who have a weighted score greater than a particular number. For example, previously abandoned shopping cards could yield a score of 20, a previous search in the area of interest could yield a score of 1, and the existence of a membership at a gaming website could yield a score of 5, among others.

The weighted score can be assessed when the campaign is initiated to generate the initial audience list, appending an audience flag for the user, or, in another embodiment, the weighted score can be assessed dynamically in real-time upon triggering during a checkout state transition or a browsing state transition, among others. A triggering event is detected during computational interactions by the user in the mobile interface or a website, and these triggering events can include website transitions, purchase state transitions, changes in URL (e.g., the URL has changed to a URL associated with a checkout), and in further embodiments, the triggering event may include the presence of a particular SKU being listed on a webpage (as extracted from the received HTML). In another embodiment, a listener process is maintained on a mobile application to identify and/or intercept an activation command for a digital wallet or payment process to be launched, such that offers and coupons can be inserted in real-time into the digital wallet or payment process in the form of interactive visual interface elements.

Real-time assessments of all of the components of the score may be computationally complex, so in some embodiments, only a differential is determined from the portion of the weighted score elements that are prone to change over time. For example, a relatively static portion of the weighted score elements may include gender, post codes, while a dynamic portion of the weighted score elements may include search history, abandoned digital shopping carts, among others.

The audience list represents the audience identified across the one or more data tables of the always protected database, and the audience is represented through flagging various user accounts or responding with a data set indicative of identifying information or identifiers associated with the particular user accounts. The identifiers can be proxies for identity to help preserve privacy. The audience list can be a separate data table in an embodiment, which can then be combined with other data tables using a primary key whenever the audience list is needed to be used alongside other data. In another embodiment, the audience list is a set of data records that are appended onto an existing data table. The audience list can include query output generated results, such as integers having weighted scores (intTotalTargetScore=95), Boolean outputs (isTargetCustomer=TRUE), among others.

The audience may be specifically generated for example, to generate maximum word of mouth for a particular product, and this is useful especially where availability of a particular product or service is scarce. The offers can also have dynamic features and characteristics, such as variations on an offer are generated by perturbing various characteristics of the offer (such that a most favorable version of the offer would be presented based on tracked characteristics of the user or past preferences). For example, for a particular user, two for a discount deals are tracked in the user's profile as being of particular interest (e.g., unbeknownst to the system, the user often buys items having such a discount to share with a spouse). Conversely, the user may be single, and the system may be configured to automatically bias away from two for a discount type deals, because the user typically does not have anybody to share the second product with. Rather, for this user, a smaller direct discount may be of more interest. The interest can be computationally represented through the features stored in the user's profile and in the weighted linkages between nodes that represent the linkages between intent features and outcome features.

As outcomes are attained, the linkages and profile representations are updated and refined such that, in this example, the profile representation begins automatically favoring a type of offer or coupon. A benefit of using semantic tokenization of query and navigation intent features is that the system is now able to automatically capture additional non-linear and non-direct relationships that would otherwise be difficult for a retailer to tune for. For example, a particular user may conduct a large amount of research on large, expensive purchases, conducting significant price comparisons and reading reviews, and the user profile, through intent information may be adapted to automatically recognize this behavior. Accordingly, in this example, whenever a large amount of research is done, the user is very price conscious, offers that will be surfaced by the system 102 may include only offers having a particular level of discount On the other hand, for the same user, whenever the user does not conduct a large amount of research, the profile may indicate a preference towards free or expedited shipping (e.g., increased convenience), and offers and coupons can be tuned or selected to emphasize convenience related options.

In some embodiments, the intent tracker system 102 securely interoperates with a trusted execution environment (e.g., a "virtual clean room"), where the first data set representative of intent-based interactions with the eCommerce web pages associated with a specific user is loaded along with a set of privacy related information that can be used for securing the first data set.

The trusted execution environment maintains the always protected database and the integrity thereof. The trusted execution environment segregates the always protected database such that query interactions are limited and the data tables themselves may not be directly accessible by the various parties.

In an example, the trusted execution environment may be configured such that the information stored thereon is not accessible external to the trusted execution environment, and the trusted execution environment may receive or be loaded with one or more encryption keys associated with the user such that the user is able to control an amount of access or a query level associated with the first data set by, in some embodiments, providing a privacy preference setting information data object to the data custodian of the trusted execution environment, or in other embodiments, providing a specific encryption key that allows the trusted execution environment to access the loaded data only to a particular level of permissions (e.g., only aggregated information, only certain fields).

Figure 2B:
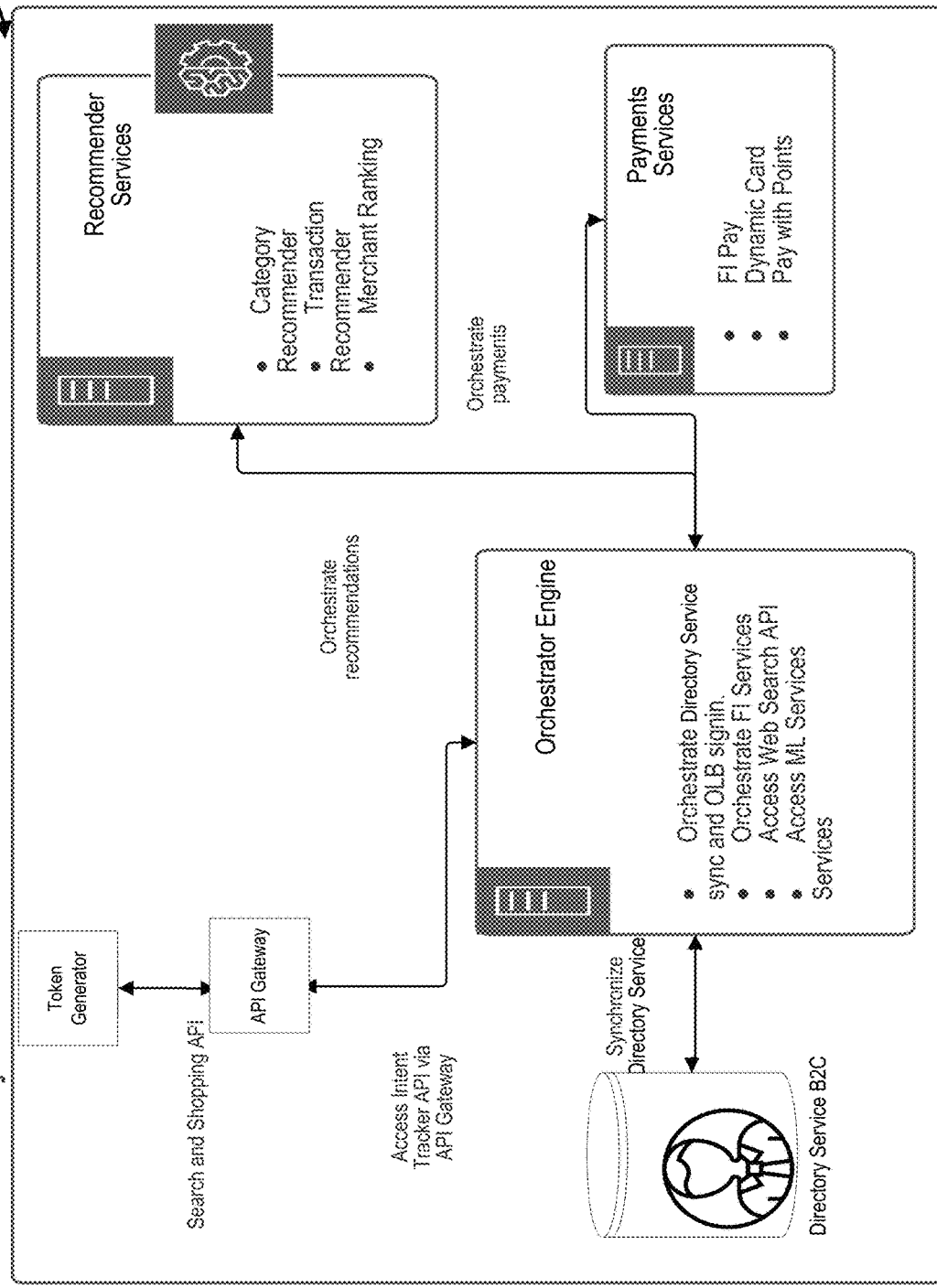
Figure 2C:
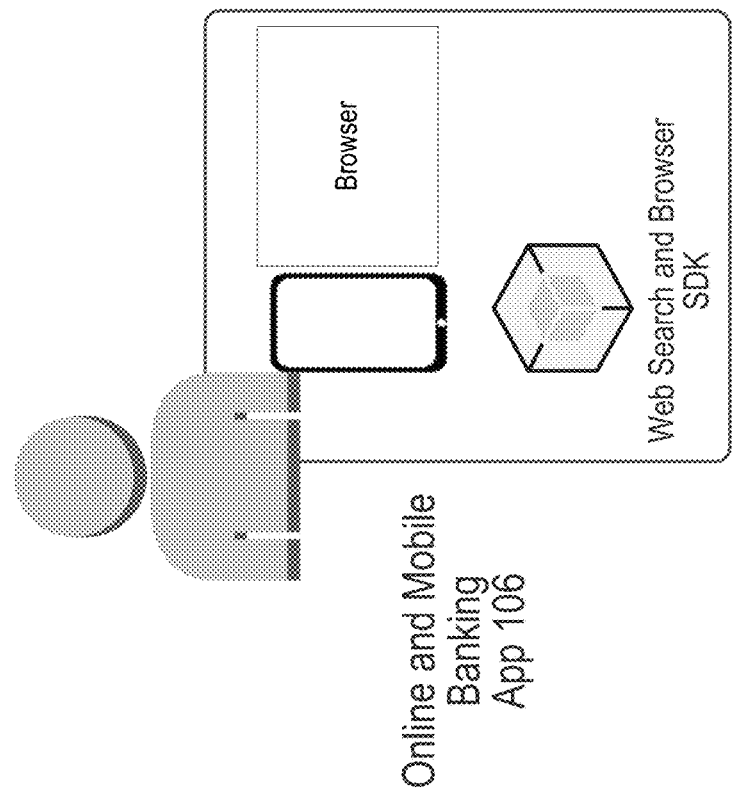

The system 100 provides an architecture having a data processing orchestrator device or service provided by financial institution system 104 (shown in more detail at FIG. 2B) which securely interoperates with data sets at various points in time associated with a set of eCommerce interactions a user may have with computer systems. The data sets are obtained from different data repositories, and are combined together for analysis such that the first data set representing intents (e.g., web search/browse history) can be combined together with a second data set representing outcomes (e.g., purchase transaction history, web site shopping carts).

The second data set can be obtained, for example, from payment processor engines, and tracks the actual outcomes of various transactions to determine whether they were consummated or not, and what coupons or offers were applied. The second data set can be obtained having differing levels of transaction specificity. For example, in some embodiments, the second data set only has a user identifier along with an aggregate amount spent on a particular transaction at a given time for a merchant or vendor. The second data set in this example, may be limited such that it does not have SKU level information. In this example, the system 104 may be configured to take additional steps in creating linkages to estimate SKU level information. In another example, the second data set can be obtained having SKU level information readily available such that individual products and services associated with the transactions can be identified.

Linkages can be established, for example, based on temporal proximity to a purchase, whether the purchase was conducted in a same window or sessional instance, whether the purchase was related to a particular semantic string identified in the recent intent tracking input elements, and the initial strength (e.g., weighting) of a linkage can be modified based on how confident/how close the outcome is relative to the intent. For example, it could be based on temporal proximity (e.g., all purchases in the past five minutes is given a score of 1, half an hour is given a score of 0.8, day is given a score of 0.5, and in the last week would be given a score of 0.2. In some embodiments, all intent features and all outcome features being tracked have an initial score of 0.0, and are updated over time as outcomes are tracked. The linkage model can then be utilized for offer/coupon generation, and in some embodiments, the system 104 is designed to maximize outcome scores when promoting new offers and coupons to the user (indicative of increased convenience or relevance to the user).

Outcomes can be tracked and associated with profile re-tuning machine learning rewards or penalties such that the outcomes can be used in a form of a reinforcement learning engine, where an agent is maintained based on world interactions (e.g., the user's interactions with real-world websites), the machine learning model acting as an agent designed to optimize a particular outcome through determining which users should be eligible for a particular offer or coupon. As described in various embodiments below, the relationships between particular offers and coupons with one another or with merchants can also be maintained and tracked over a period of time to computationally understand or represent which merchants or coupons are related to one another (e.g., coupon to coupon or merchant to merchant). Semantic search capabilities can then be used to expand the available set of training outcomes or offer/coupon options by computationally estimating relations between merchants and coupons, or between coupon and coupon, for example.

The financial institution system 104 can interoperate with a token generator to create and manage tokens linking the transactions to specific account identifiers for one or more users. This provides a layer of security abstraction as it may be paramount to maintain the security and privacy of the account identifiers and the linkages thereof. For example, the account identifiers can be replaced for each user with a substitute token or user identifier that can be a token that is managed by the token generator (e.g., periodically refreshed or updated). The information generated by financial institution system 104 can also be loaded into the trusted execution environment such that privacy levels and access levels can be controlled.

The financial institution system 104 can include an orchestration engine that is configured to retrieve the first data set and the second data set, or modified versions thereof if specific privacy settings are enabled. The financial institution system 104 is configured to generate data linkages between the first data set and the second data set such that intent data and outcome data can be combined together to generate improved insights. The orchestration engine uses the data linkages as a trained model for receiving and inferring output features such as a next best merchant, a next best price, among others, and interrelations between coupons and coupons, and between merchant and coupons.

As noted above, the data linkages include whether a particular transaction was consummated after research, and in some embodiments, intent tracking or estimation engines are also utilized to generate computer estimated intentions from the first data set, both at a transaction level (e.g., John is trying to buy a computer fan able to power a 500 W power supply) and at a thematic level (e.g., John is building a computer capable of playing the latest AAA video game), and these intents are matched against the purchase outcomes associated with the user.

The orchestration engine is configured to transform, based on the one or more data linkages, a set of offer parameters or offer selections for a target user such that the offer parameters or offer selections can be tailored specifically for that user. For example, an estimation may indicate that the user is still looking to buy a power supply but the right price has not yet been achieved, and in an attempt to finalize the sale at an acceptable price, the offer may be transformed such that the price now fits within the range suitable for the user's needs, albeit being a refurbished model or used model.

The orchestration engine controls the rendering, on a display of a computing device utilized by the target user in interacting with a web page of the one or more webpages, a visual display element representative of the transformed set of offer parameters or offer selections for the target user.

Figure 3:
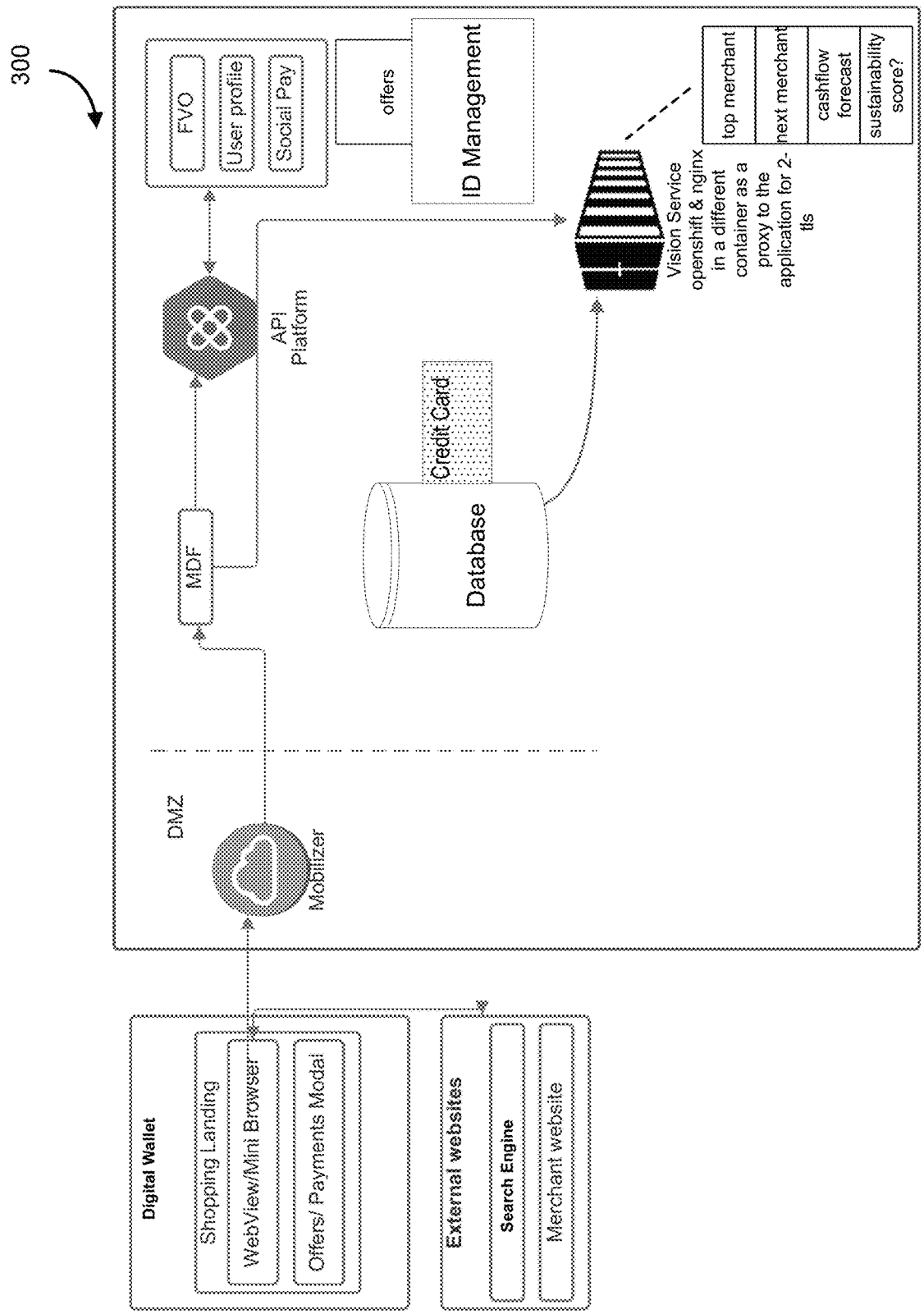
FIG. 3 is an example schematic of a data flow diagram for the orchestration engine, according to some embodiments.

FIG. 3 is an example schematic of a data flow diagram 300 for the orchestration engine, according to some embodiments. In FIG. 3, payment information can be obtained, for example, from a mobile wallet application, and intent information (e.g., search queries, internet browsing history), can be obtained from various external websites. The data can be stored in a database data source.

Figure 4:
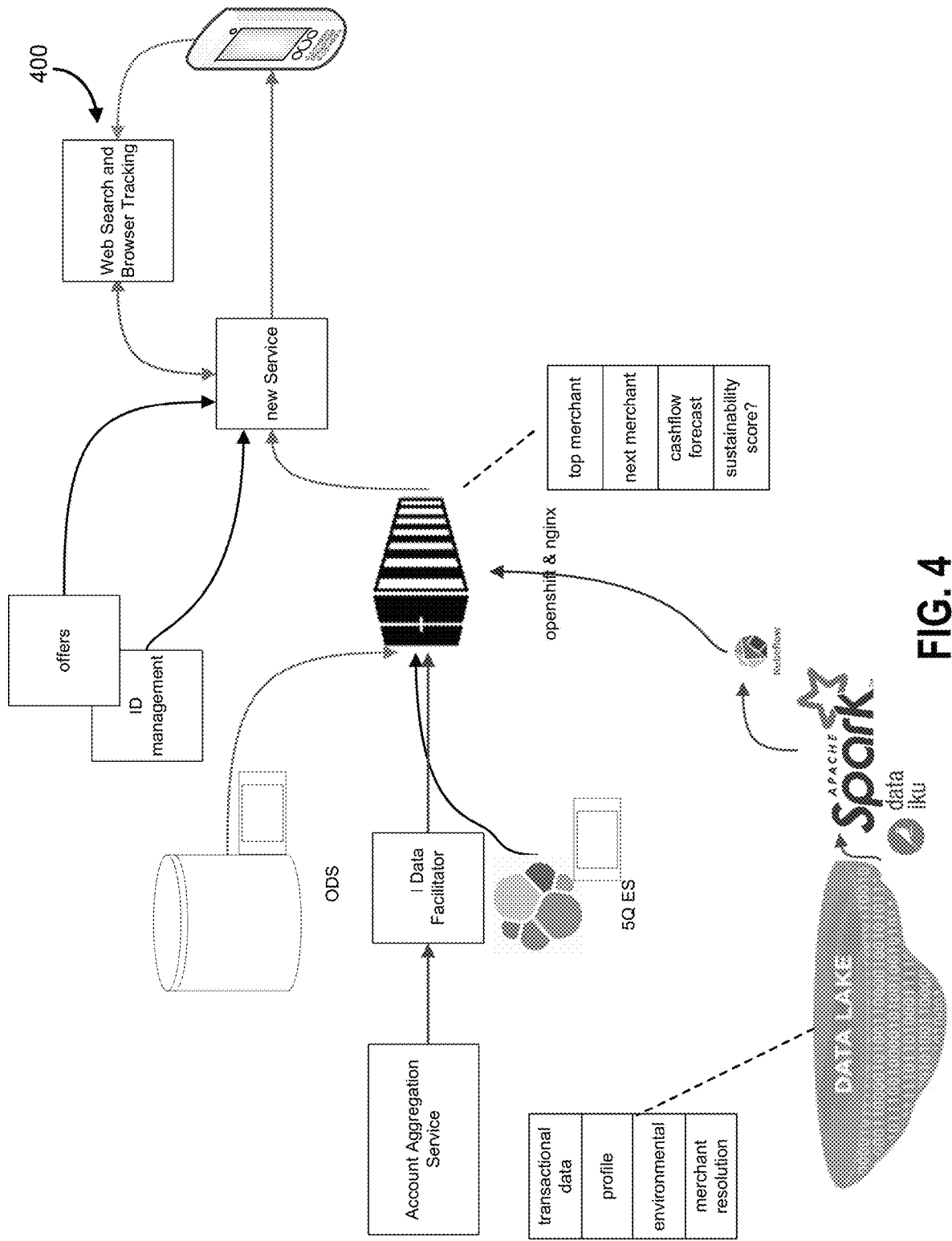
FIG. 4 is an example schematic of a computing architecture for the orchestration engine, according to some embodiments.

FIG. 4 is an example schematic of a computing architecture 400 for the orchestration engine, according to some embodiments. In FIG. 4, the first data set and the second data set may be stored in the data lake, which is a data warehouse adapted to expose certain data to the orchestrator engine.

Figure 5:
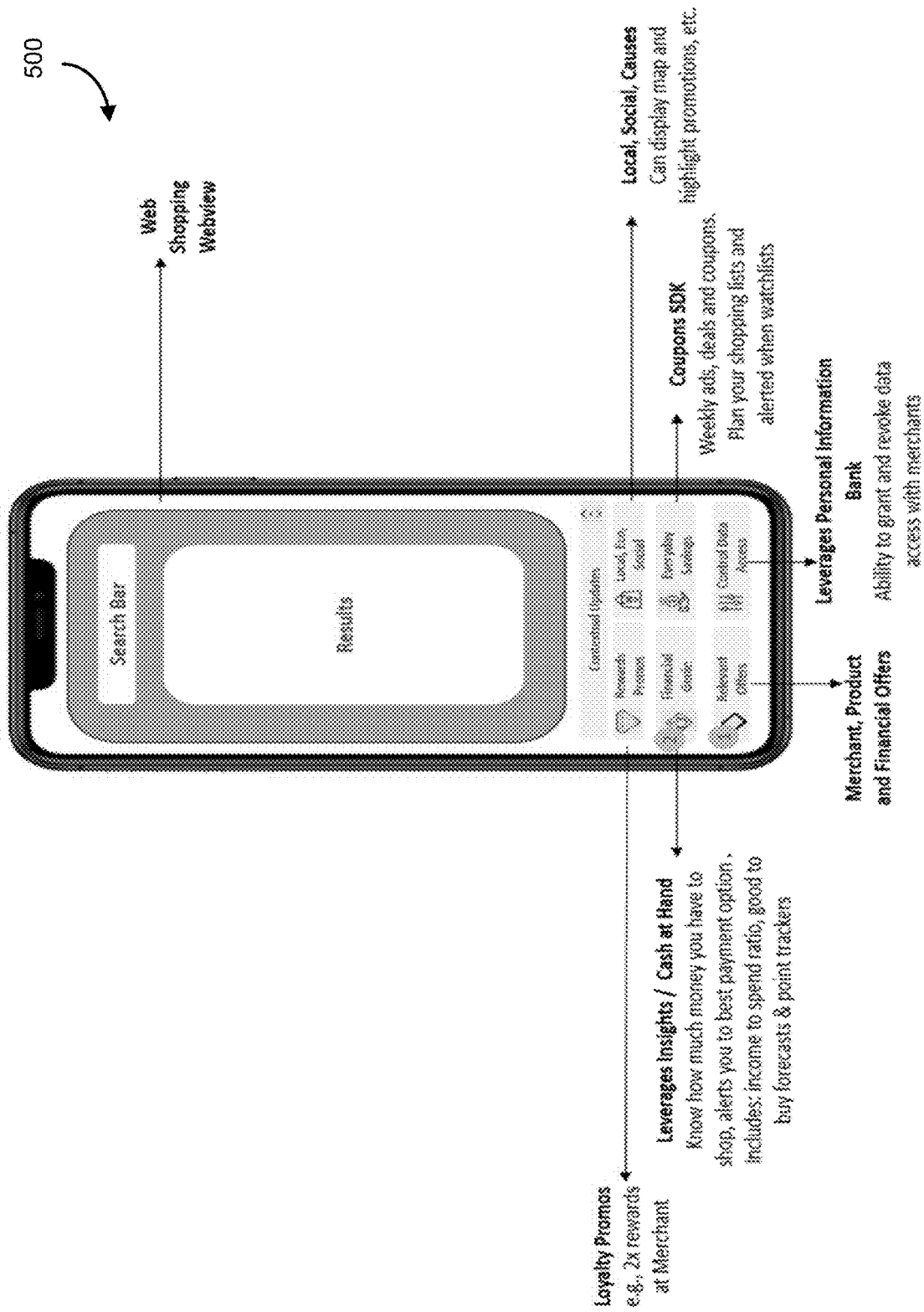
FIG. 5 is an example rendering of an improved display having a combination of a web shopping webview augmented with visual interface elements based on the data linkages, according to some embodiments.

FIG. 5 is an example rendering 500 of an improved display having a combination of a web shopping webview augmented with visual interface elements based on the data linkages. In some embodiments, the web search experience itself is augmented based on the data linkages, and in further embodiments, the contextual information added onto the interface (for example, as a widget bar) surface additional information elements, such as showing insights, personalized offers, among others.

The improved display can include one or more sliders or controls adapted to modify privacy settings, which, for example, can modify how information can be retrieved from a trusted execution environment. In this example, the user's mobile device may store one or more keys that can be provided to the trusted execution environment to modify the types and amount of data to be obtained from the trusted execution environment for use in establishing linkages between intents and outcome data representations.

Figure 6:
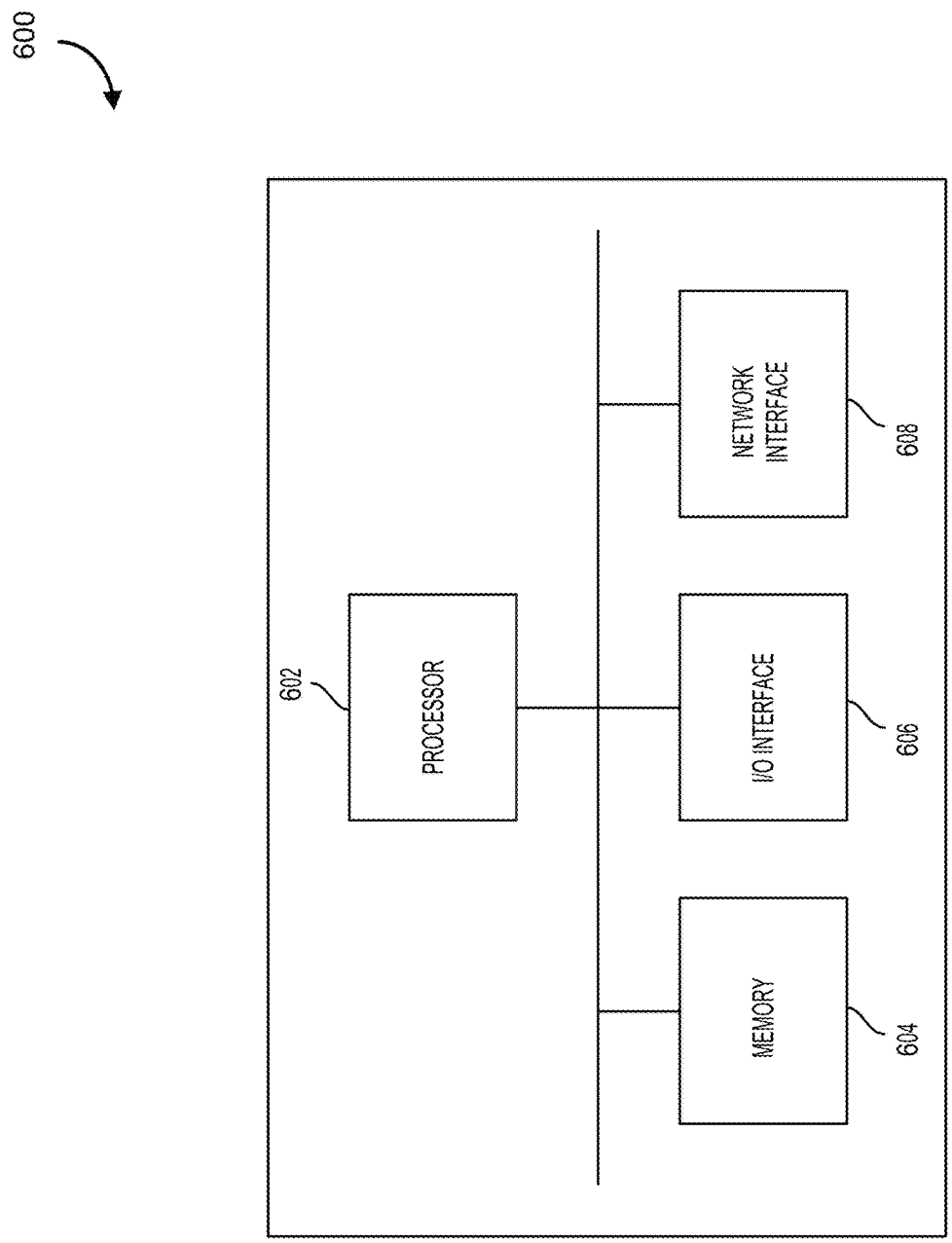
FIG. 6 is an example schematic of a computing system or device that can be utilized in implementing the data process linkage system, according to some embodiments.

FIG. 6 is an example schematic of a computing system 600 or device that can be utilized in implementing the data process linkage system, according to some embodiments. Processor 602 can include computer microprocessors, field programmable gate arrays, or processor chips, and the system 600 can include a desktop computer or a computer server or computing appliance. Memory 604 can include various types of read only memory, random access memory, among others, and the system 600 may be configured for receiving user inputs through input/output interface 606, communicating with other devices through a network interface 608 through the Internet, an intranet, or other types of local and wide area networks.

Figure 7:
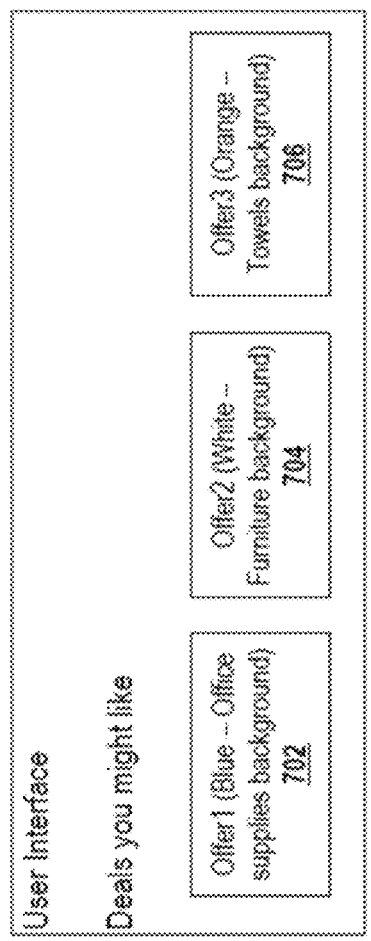
FIG. 7 is an example rendering of deals that may be presented on a user interface, according to some embodiments.

FIG. 7 is an example rendering of deals that may be presented on a user interface, according to some embodiments. In FIG. 7, a user interface 700 is shown where there, for example, a number of different deals are presented in the form of interactive visual interface controls. These are presented as different options, for example for supporting a reinforcement learning approach based on a multi-armed bandit model, which in this case can be applied at an actual coupon level (or a merchant level). Three example offers are shown as offers 702, 704, and 706.

From a computational perspective, the offers are represented in the form of Offer 1(10% off, Merchant1, electronics, office background, blue, size=0.9); Offer 2: (BuyOneGetOne50% off, Merchant2, furniture/home décor, furniture background, white, size=0.4), Offer 3: (5% off and free shipping, Merchant 3, bath supplies, towels background, white, size=1). In the multi-armed bandit approach, the system is used to feed back information indicating which offer was selected and which were not for use in re-training the system or varying linkage connection weights, according to some embodiments. The offers are not only tracked from an offer type perspective, but in some embodiments, additional features are tracked also in respect of the visual rendering of the offers themselves (color, size, among others).

As described, the offer can thus be provided in an offer recommender engine that recommends coupons and other user behaviours that can be tracked in relation to an interaction include (number of transactions, clicks, recent searches, next best merchant), and coupon information (e.g., category, colours used in image, description text).

The offer recommender engine can be configured to provide the following input data set:

Coupon data: the information about the coupon based on merchant and category or product level.

Contextual data: Data contains user demographic/geographic data, purchase history, their spending on merchant or product category, frequency of a purchase per merchant/per product category, day of the purchase, frequent buyer, revenue generator (75% percentile or above or some other condition)

Recommendation list: coupons per merchant or coupons per product category, coupons per product Reward list: coupon values or some other values (can be based on preference)

The offer recommender engine can output an offer recommendation, which can be provided, for example, in the form of a normalized or raw score that can be used to rank which offers would be shown for the multi-armed bandit (e.g., surface the top 3 offers). Accordingly, over time, as different offers are shown, the multi-armed bandit model can be used to tune the offers with an aim to optimize acceptance of a particular offer being shown.

The offer recommender engine is an improvement over traditional systems, as it can be configured to automatically handle a constantly changing nature of coupons, and vary for shopping choices that change over time for various reasons, such as seasons, time, changes in life situation, etc. The approach can also be used to address cold start problems by generating recommendations for a user based on demographically available or similar users to establish recommendations for a new user when the system does not yet have sufficient in their user profile. In some embodiments, the improved offer recommender engine is also capable of implementing logic to influence the recommendations and to tailor recommendations to improve an outcome. For example, a system could be configured to dynamically alter a recommendation based on a provided range (e.g., the system may be provided discretion to provide the user between 5 to 15% discount, but instructed to remain close to 5% when possible). Based on the input features and linkages, the system may indicate that for a particularly price conscious purchaser, there is very low confidence in a purchase at 5%, but very high confidence in a purchase at 10% discount, and in this situation, the improved offer recommender engine can tune the offer to provide a 10% discount.

Figure 8:
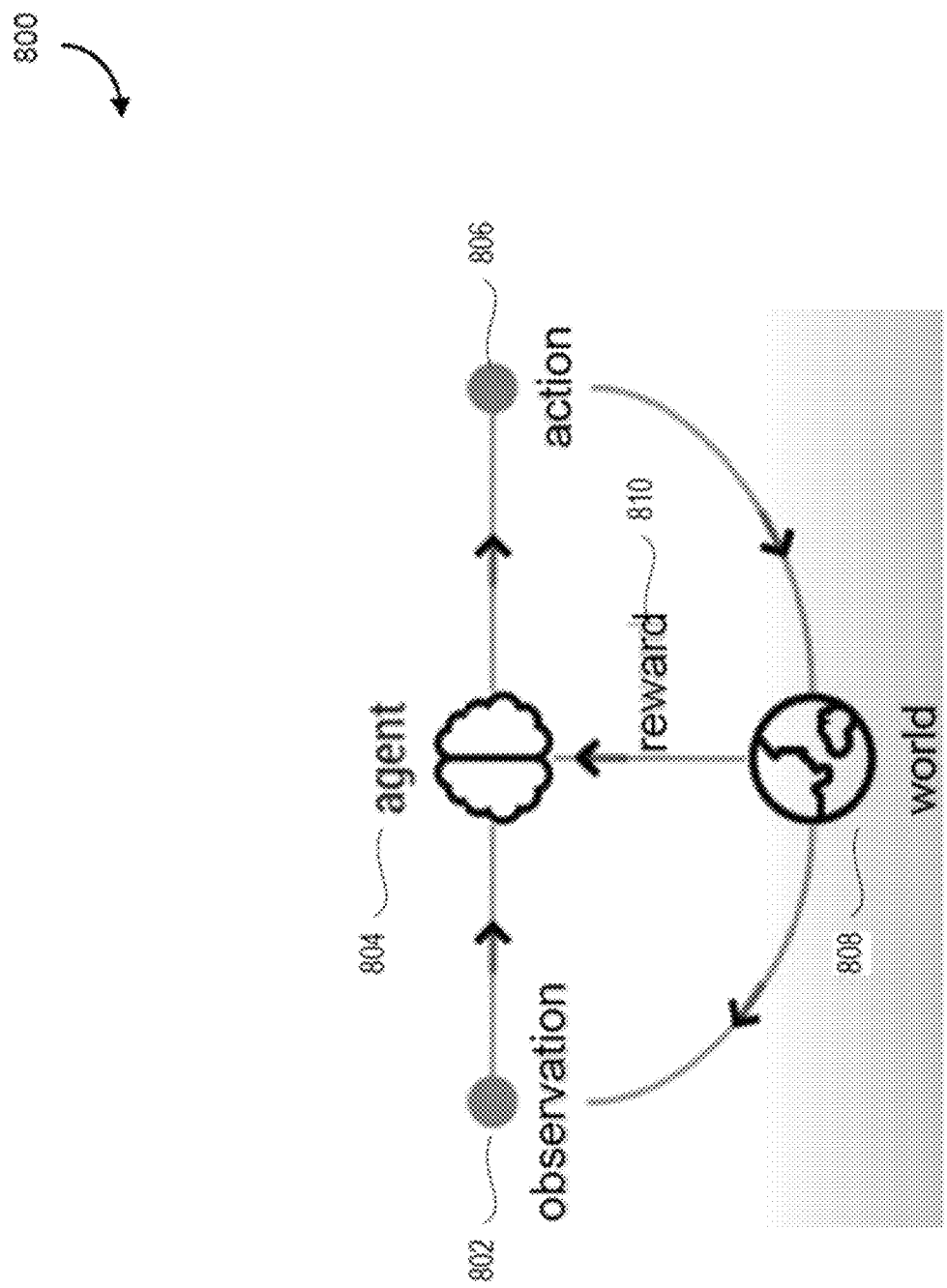
FIG. 8 is an example schematic of a reinforcement learning model, according to some embodiments.

FIG. 8 is an example schematic of a reinforcement learning model, according to some embodiments.

In this example 800, an example reinforcement learning model approach is shown, using a Multi Armed Bandit (MAB) approach based on actions and rewards. As an experiment, Applicants have proposed a modified version of MAB to predict the merchant based on a stimulated contextual data using MABWISER, a python based library for MAB.

In the proposed MAB approach, the system first includes instantiating a machine learning model data architecture adapted for reinforcement learning. At 802, the approach includes obtaining observations (e.g., based on selecting of an offer among a plurality of offers, and an agent 804 (a mechanism that acts based on the machine learning model data architecture) is trained based on actions 806 taken by a user (e.g., selecting an offer, interacting with an offer, clicking on an offer), which are observed in the "world"/ecosystem at 808. The selected offer is rewarded at 810 or conversely, the non-selected offers are penalized at 810, or both.

The machine learning model data architecture including one or more weighed interconnections between nodes representing the first data set, the second data set, and the set of offer parameters. In another embodiment, the nodes also include representations based on the tracked data linkages between the first data set and the second data set.

The machine learning model data architecture represents a latent space through the weighted interconnections, and can include a neural network. Over time, the machine learning model data architecture is trained based on user selections of offer parameters leading to positive out-come based interactions in the second data set representative of outcomes. The approach is adapted for use with offer and coupon generation, where a model will be trained on user contexts, coupons, and rewards, coupons can be recommended, and based on a user's reaction to the recommendation (e.g. save, click), the model is assigned the rewards/penalty.

The agent 804, using the machine learning model data architecture, identifies offers to be presented to the user, and in some embodiments, automatically selects and presents a plurality of offers to be used to obtain information through the user's selections. The transforming of the set of offer parameters or offer selections for the target user can include selecting one or more offers for the user based at least on an output value generated by the trained machine learning model data architecture, such that the machine learning model data architecture indicates what offers to show.

A plurality of offers are selected for the user to be rendered on the display of the computing device, and in a multi-armed bandit approach, the model obtains information by utilizing the set of offers as a set of multi-armed bandit training inputs for the machine learning model data architecture.

Each of the offers is distinguished from one another through their individual characteristics, and vary from one another, and these can be represented as individual features in the machine learning model data architecture. The closer the offers are to one another, the more information about preferences can be automatically gleaned.

For example, if there are three offers presented, all of which relate to the same product that the user is keen to purchase, but have differences in coupon discount amount, shipping costs, add-on items, the system will obtain more information about the specific preference of the user. For example, the user may be single and volume discounts may be of less importance, while free or expedited shipping may be of more importance. The offers can be presented on a display of a computing device, for example, as side by side offers. The offers can also have parameters that vary for the multi-armed bandit that are not directly relating to offer characteristics, but rather relate to how the offer is shown or rendered (color, size, animations, positioning) in the user interface. Similarly, other parameters can include swapping out the specific product for a competitor product to assess the user's level of preference for store-brands as compared to name brands, etc., and a willingness for substitution.

Accordingly, the multi-armed bandit approach is not only a useful way to improve the relevance of offers, but in some embodiments, the selections from the multi-armed bandit approach form part of the second set of outcome information, and the corresponding data linkages between intent and outcomes can be further automatically updated to bias towards this interconnection (e.g., user searches shipping costs often, and outcomes are more positive when shipping is free, even for a economically equivalent discount, potentially due to psychological reasons).

The model is then updated using the new information about reaction to coupon their rewards, and based on new updated model, recommendations will be made.

Accordingly, the rewards and penalties are used to help the model adapt to the dynamic environment (user choices or coupons).

Example hyper parameters for MABWISER model:
Learning policies such as Epsilon greedy, Upper Confidence Bound, Thompson Sampling, etc. helps the model maximize its gains by optimizing the balance between exploration phase and exploitation phase.
Neighboring policy such as K-mean neighbour, minibatch-K-means, Locality-sensitive Hashing nearest neighbor, and Radius helps model to cluster the data for better prediction.

The offer recommender can be built based on a contextual Multi-Armed Bandit approach, where apart from decision (arms) and rewards, the system takes contexts such as any information about user or product into account.

There are three types of features that can be provided:
1. Decision: coupons to offer
2. Reward: revenue generated
3. Context:
   Coupon text embeddings
   Merchant's logo embeddings
   Weekday/weekend
   Average spend by user weekly
   Holiday
   Coupon image embeddings
   Time of the day
   Clicks
   Saved to the wallet
   Transaction rate A base model for offer recommender can be created using coupon text embeddings and merchant's logo, embeddings which both have their use cases as described below.

For text embedding, Applicants have experimented with many embedding algorithms such as TFIDF, Word2Vec, Doc2vec, and Bert based sentence transformers (SBert). In particular, Applicants have used SentenceTransformer ('all-MiniLM-L6-v2') which is based on pretrained nreimers/MiniLM-L6-H384-uncased and further fine tuned in on 1B sentence pairs dataset which maps sentence to a 384-dimensional dense vector space. Apart from being used as features for a model, these text embeddings have many use cases such as clustering or semantic search. These approaches can be used to enhance the available semantic variants for replacement or augmentation of various terms.

Figure 9:
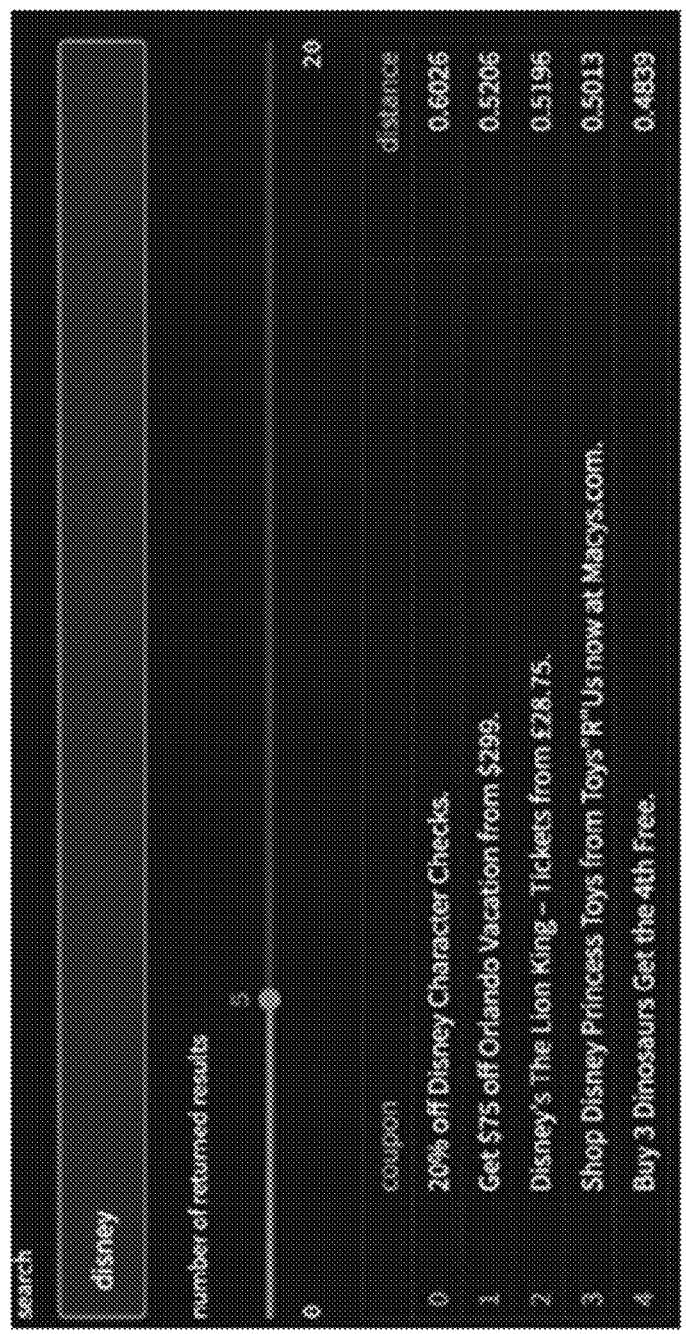
FIG. 9 is an example rendering of clustered search results for a semantic search, according to some embodiments.

FIG. 9 is an example rendering of clustered search results for a semantic search, according to some embodiments.

In this example 900, coupon text embeddings can be grouped together to provide clusters of similar items based on cosine similarity metric, or based on outputs from a machine learning model optimized for positive purchase outcomes, or a combination thereof (e.g., the model output could be used to weight the cosine similarity metric).

Semantic searches can be utilized to expand a set of results. For example, the system is tasked with finding a coupon for "Disney" then it will find the deals not only related to word Disney, but also deals associated with Orlando, Disney's products (toys, movies, etc.) with its cosine similarity score. Semantic enhancement approaches can be used to expand search queries in some embodiments, for example, by replacing search terms with semantic variants.

Either the search term itself or semantic variants can be used (either individually or in concert), and semantic distances can be established for various available offers, as shown in the distance column in the diagram of FIG. 9.

In FIG. 9, a number of coupons representing offers are shown (coupons 0-4), having specific textual descriptions and a distance. The distance, for example, can be used to establish the specific semantic distance from a particular query or semantic variants by the user. For example, the first offer has a direct match, while the second offer shown matches a semantic variant (Orlando vacation). As a number of returned results is changed on a slider, more distant results can be shown in the set of offers.

The offers can also be grouped together and interrelated using various types of graph data structures, which can be generated using network analysis. The interconnections for the network analysis can be established using semantic analysis similar to the semantic search used to generate variants. For example, the interconnections could be established based on semantic distances from offer to offer, for example. As such, network analysis can be used for semantic search, by using semantic search to further extend to create a network of coupon-coupon, coupon-merchant, or both. These networks can be further used to build recommendation systems or community detection, or clustering as well.

Figure 10:
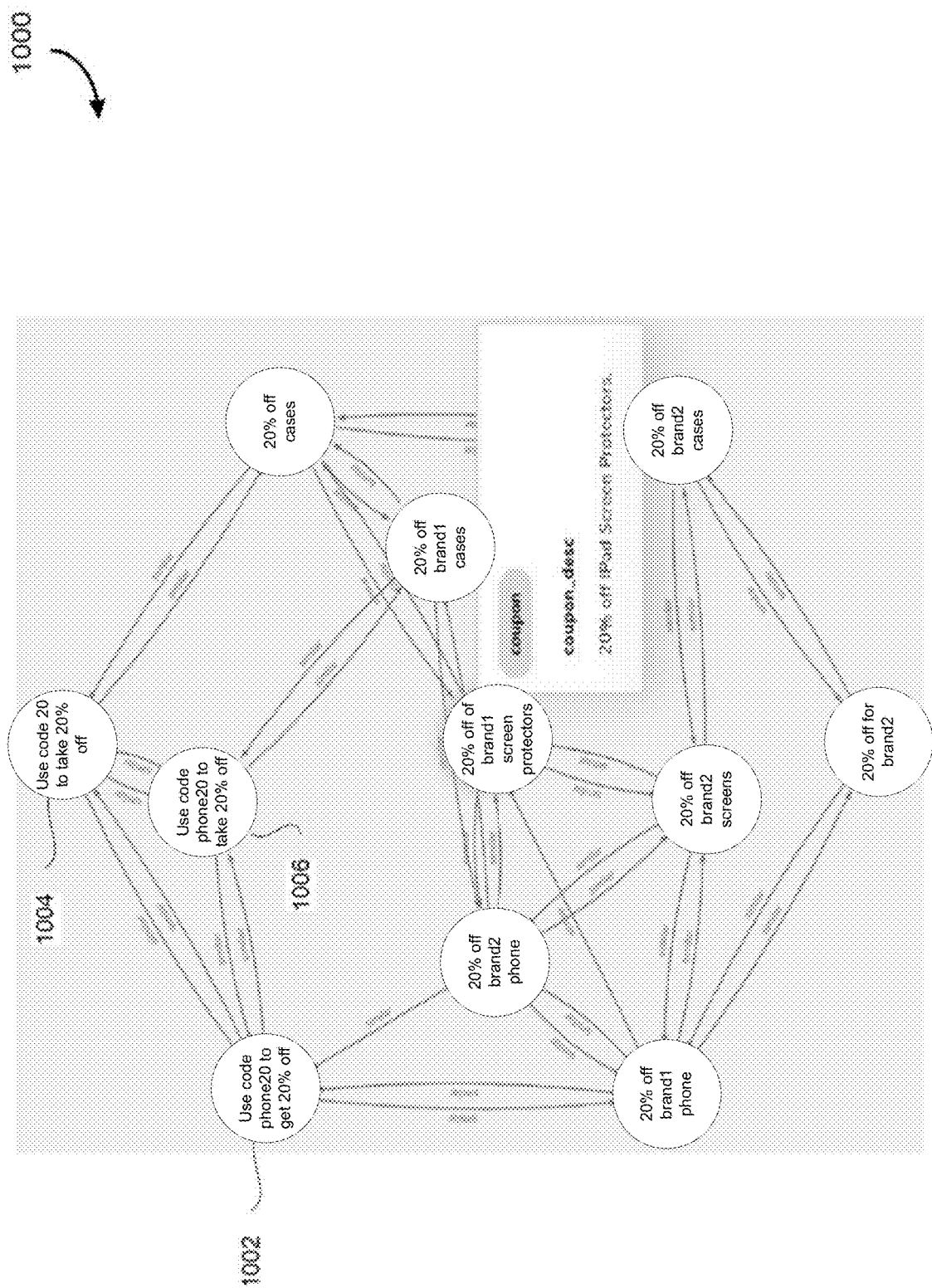
FIG. 10 is an example rendering of a data representation of coupon to coupon network, according to some embodiments.
Figure 11:
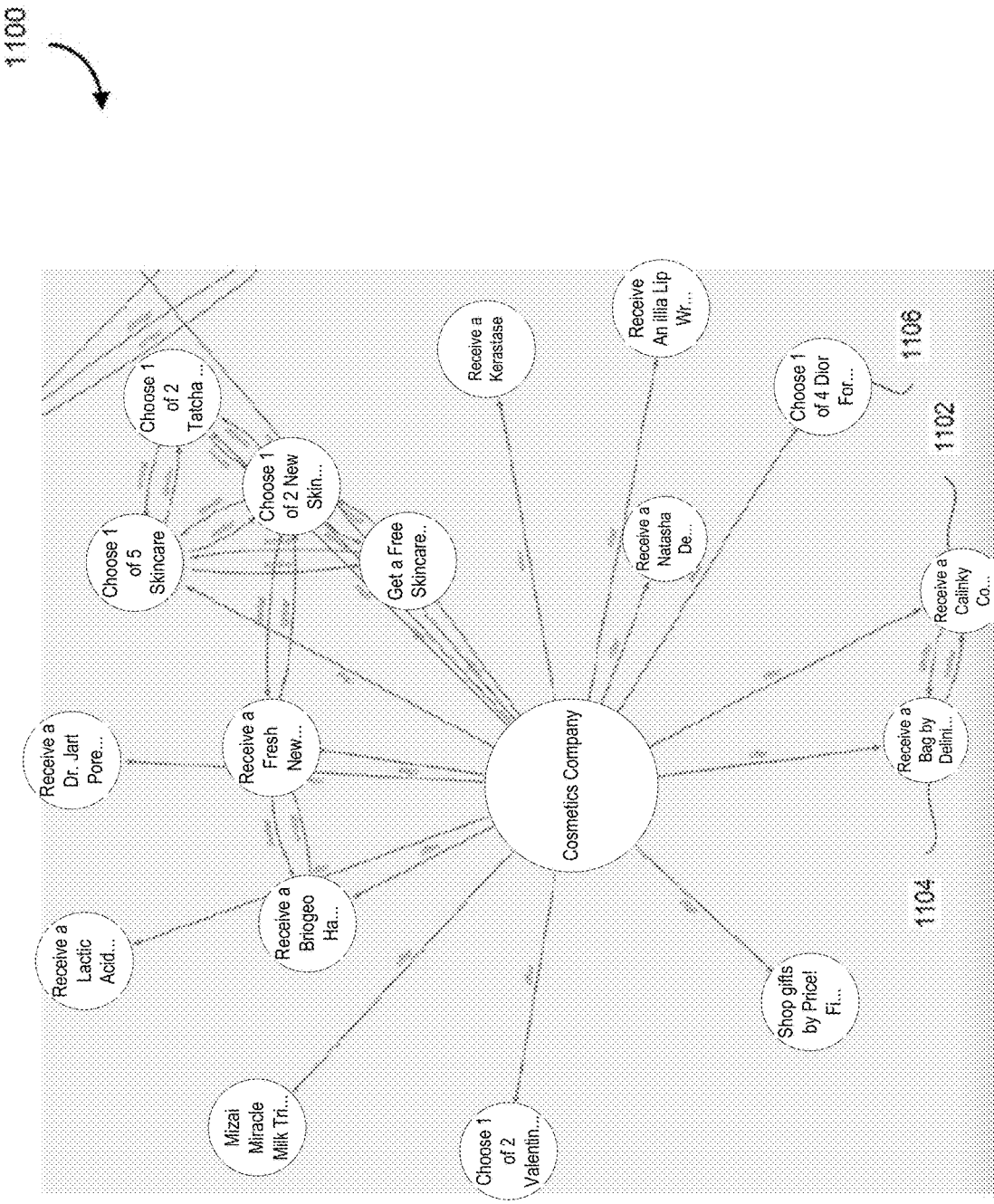
FIG. 11 is an example rendering of a data representation of merchant to coupon network, according to some embodiments.

For this, Applicants created a data frame of the top 5 similar offer/coupon for each given offer/coupon. Using the coupons as node and edges if they are semantically similar, the system generates a coupon-coupon network, as shown in an example 1000 in FIG. 10. Furthermore, merchants can also be added as nodes, and edges between the merchant and the coupon can be established if the merchant offers that coupon. This example is shown in example 1100 in FIG. 11.

The graph networks can be used to modify the MAB selections, in some embodiments. In particular, while the MAB selections can be based on a simple ranking of relevancy scores relative to the user's query (imputed or explicit), in another variation, the graph networks are utilized together with the relevancy scores relative to the user's query. In a first variation, a most relevant offer is first selected based on the semantic distance (e.g., the offer having the highest semantic distance score). In some embodiments, the semantic distance scores are modified or determined further based on a machine learning model tracked representations of the user through the intent data sets, the outcome data sets, and/or prior offer selections.

After the most relevant offer is selected, the additional offers for the MAB are selected using the graph network instead in this variant. The graph network is interrogated for closest neighbors. For example a particular offer is selected in FIG. 10.

The corresponding node is identified, in this example, the node 1002, and node 1002 would be the first offer. After that node is selected, the graph network is then interrogated to identify nodes 1004 and 1006, the two neighbor nodes that have the highest semantic similarity score to node 1002. For the MAB reinforcement learning process, the offers of nodes 1002, 1004, and 1006 are presented. This approach is useful because it picks nodes with minor differences such that these differences can then be used for obtaining very specific information through the MAB reinforcement learning process, improving the representation of the user.

In another variation, a hybrid approach can be used. Observing FIG. 11, node 1102 is chosen. In selecting another offer for the MAB approach, its neighbor 1104 is selected. However, no neighbors remain, and then 1106 is selected based on having the next highest relevancy score to the original query.

FIG. 12 is an example rendering of a next merchant display rendering, according to some embodiments. In this example 1200, four offers are shown that have been selected for the user based on the user's search history.

In this example, using the most recent searches per user, the system can be utilized to run the semantic search API for relevant offers, and the search could be a real-time match based on relevancy and/or a multi-armed bandit selection. Search history retention policies can be established based on a minimum number of searches and time elapsed sine the search.

Figure 13:
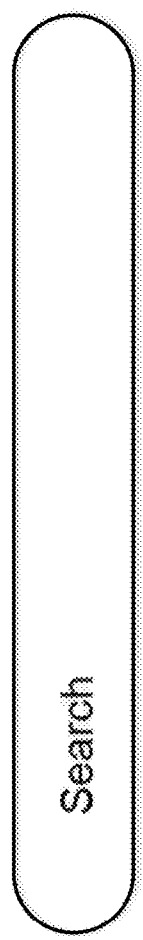
FIG. 13 is an example rendering of a search bar, according to some embodiments.

FIG. 13 is an example rendering of a search bar, according to some embodiments. Search bar 1300 may be utilized to enter a specific query, for example, querying available offers or generating a search query as part of a web search. The search query could be tokenized and broken into word tokens for analysis.

Figure 14:
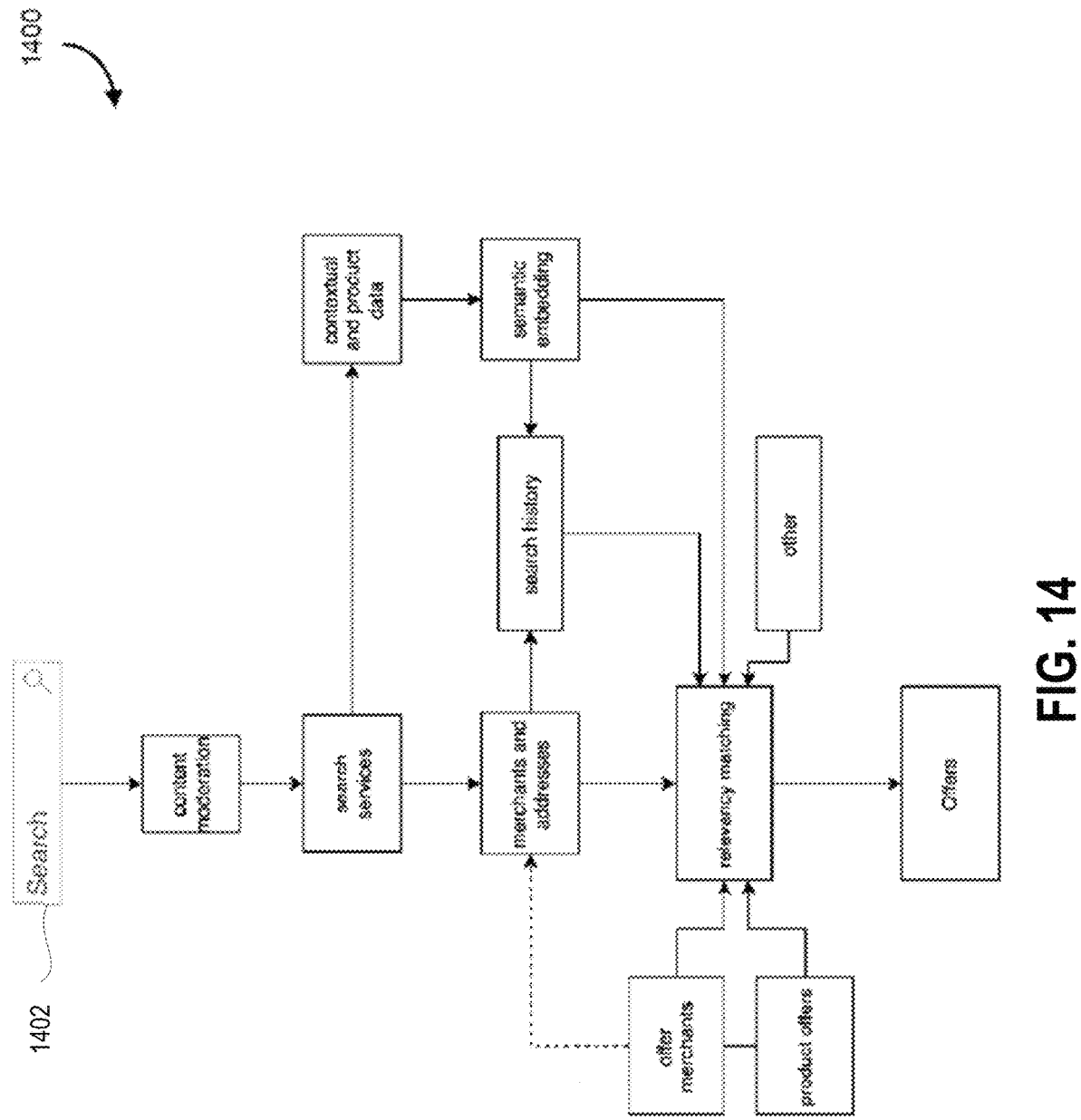
FIG. 14 is an example flow diagram of a relevancy enhancement, according to some embodiments.

FIG. 14 is an example flow diagram of a relevancy enhancement approach, according to some embodiments.

In FIG. 14, the flow diagram 1400 is shown in example and the input string can be augmented based on additional information, such as semantically similar variant words obtained from search services, merchants and addresses, prior search history 1402 of the user or other users, and the specific variants and words being used can also be biased towards specific words found in offers such that relevancy of offers is enhanced. In further variations, NLP classification (if only on text) can be introduced. An example search query, for example, would be a search for 'px7' which is a headphones model).

The search results can include ranked merchant and non merchant websites. Additional information can be found on the product or merchant place type as an example. Any information on product, merchant, or site descriptions should be returned for additional processing. Merchant domains and subdomain information can be extracted from the web addresses returned and from offer merchant databases.

Custom NERs (Named Entity Recognition) can be used for this purpose, and could be more effective than applying regular expressions or rule based approaches for parsing merchant sites. For example, some merchants might not have their own domains but rather websites under social media platforms. There may also be some merchants that have one domain serving multiple.

A semantic understanding of returned searches can be implemented, for example, by processing returned results including descriptions of products, to help improve on relevancy. Entity recognition and semantic embeddings alongside other NLP capabilities can used to help for a better understanding of intents. Search history processed results may also help with relevancy, as the user might be looking for book jackets in previous searches, and thus the system, in that context, should not show offers or rather rank first offers on clothing. Additional inputs from other predictive services, descriptive information (trending, popular) may also be aggregated as needed and used as additional weighted inputs to help for better offer rankings.

Figure 15C:
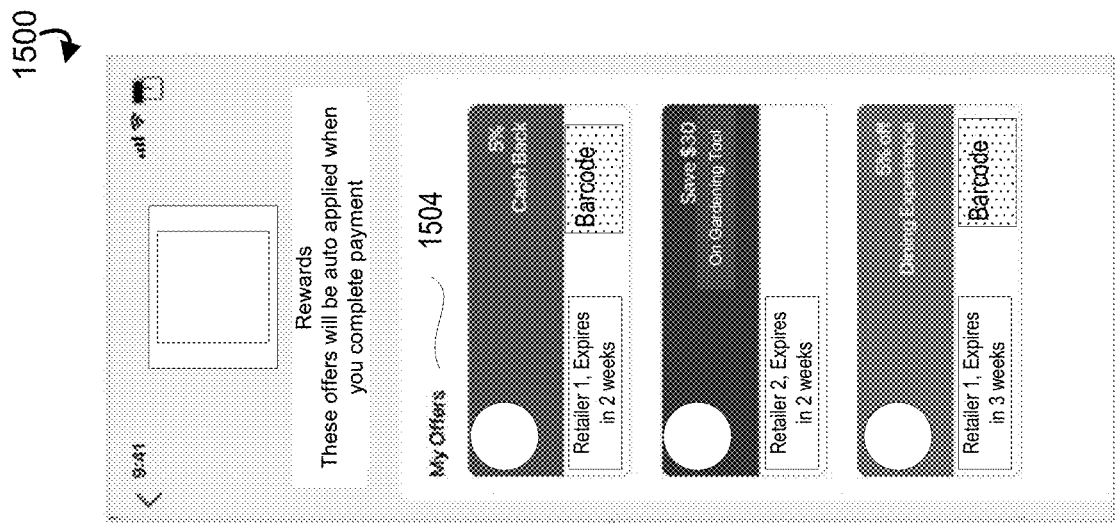
FIG. 15A, FIG. 15B, and FIG. 15C are screenshots that illustrate an example coupon or offer loading process flow whereby an offer or coupon may be loaded onto a wallet application and associated with the user, according to some embodiments.
Figure 15B:
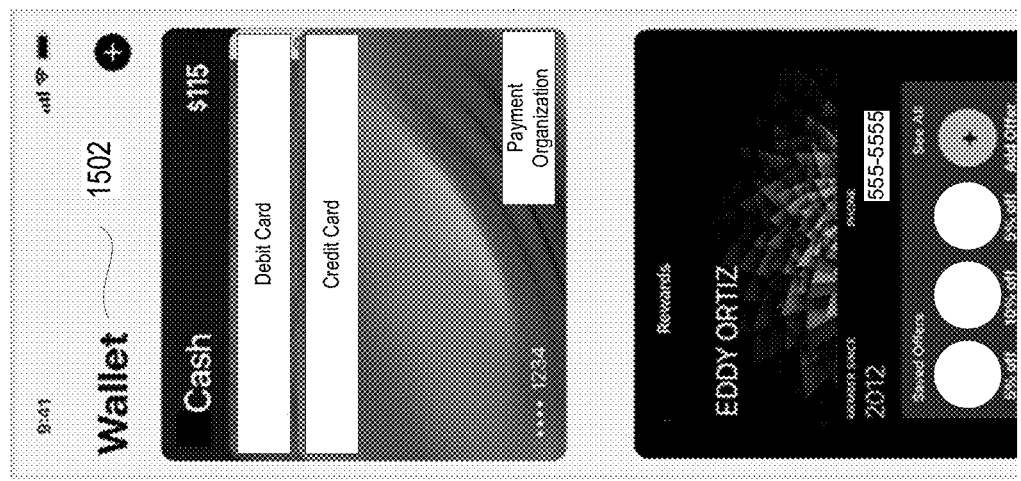
Figure 15A:
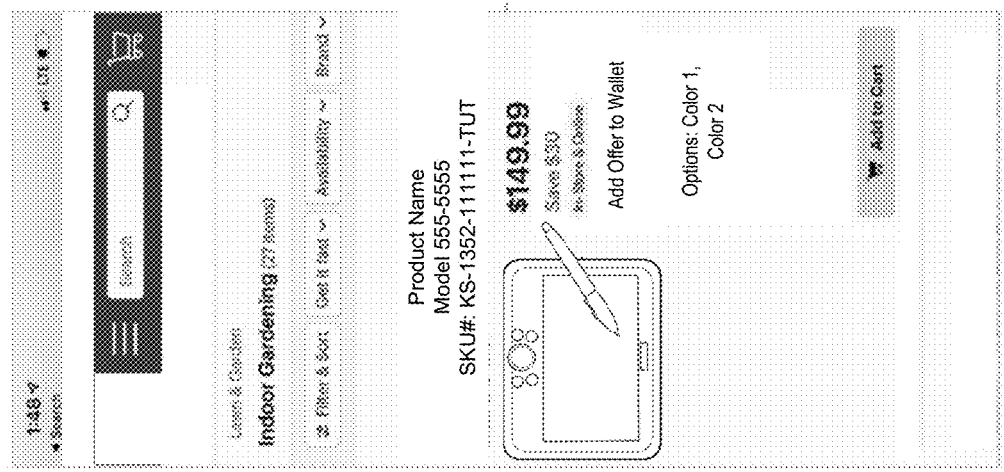

FIG. 15A, FIG. 15B, and FIG. 15C are screenshots shown in 1500 that illustrate an example coupon or offer loading process flow whereby an offer or coupon may be loaded onto a wallet application and associated with the user, according to some embodiments.

As shown in FIG. 15A, an offer or coupon is shown through an interactive interface element, which when interacted with, leads to the wallet 1502 of FIG. 15B, which shows the offer loaded on as an interactive element 1504 in the wallet. In the example of FIG. 15B, the offers or coupons are stored in a central data object which when interacted with, can provide an expanded graphical user interface screen shown on FIG. 15C listing out numerous offers and coupons, along with use characteristics (e.g., bar codes for scanning for use in physical stores), expiry dates, among others.

When a user interacts with (e.g., a touch input is obtained, a mouse click in the region) with the visual element indicative of the coupon or offer 1504, a feedback signal can be returned indicating that the coupon or offer has been interacted with to the backend system. In terms of the backend system, recordal of the offer or coupon can be tracked for feedback purposes, for example, updating a user data table to indicate that the user has accepted an offer or coupon. The system can be used for processing of the offer and coupons based on the tracked feedback. In another embodiment, when the click or interaction occurs, an injection mechanism can be used to insert coupon codes, promotional codes, etc. directly into the purchase transaction. In yet another embodiment, when the click or interaction occurs and a digital wallet item is used alongside a coupon or offer, the coupon or offer can be applied during the transaction message between the financial institution/issuer/payment processing entity. In this variation, a benefit is that the reimbursement process can be simplified as there is no need to have a data process retroactively trawl through transactions in the future to assess reimbursements and eligibility based on processed transactions. Instead, reimbursement can occur directly in the initial transaction itself, as the user could have already been pre-validated and pre-cleared in the audience list.

FIG. 16A, FIG. 16B, FIG. 16C, and FIG. 16D are a set of screenshots 1600 showing an example coupon or offer redemption process flow where an offer for an example heirloom salad kit is being applied and ultimately redeemed. In FIG. 16A, the user finishes a browsing session whereby the user is able to trigger a checkout sequence. The checkout sequence is indicated, for example, through the merchant flagging a page as a checkout sequence, parsing the URL or the URL HTTP variables being communicated, parsing the returned HTML of the webpage being rendered (e.g., identifying keywords such as payment, checkout), among others. In some embodiments, the customer journey is maintained through a stateful variable and triggers occur when a transition in states is tracked.

In this example, at the checkout process, the user initiates a call of the mobile wallet, and the user's credit card information appears. The call of the mobile wallet on the checkout page is a combined trigger for an offer or coupon to be surfaced. The identification of the offer or coupon can be conducted through a traversal or reference look up of the audience list data structure.

During the checkout sequence shown in FIG. 16B, the offer or coupon can be surfaced through a rendering of a visual control element showing the discount that may be applied, and in FIG. 16C, the screenshot shows a coupon or offer after it has been interacted with by the user to initiate an application of the offer or coupon. The offer or coupon is then applied, and the savings amount can be updated on the graphical user interface. At FIG. 16D, a user may also interact with the graphical user interface and identify what other offers or coupons remain, and potentially select another offer or coupon for application (e.g., where there may be multiple offers or coupons available).

The offer shown in this example is a coupon to save $30 on garden products, and the user may select, through a visual interface element, to apply the offer. As shown in FIG. 16B, the savings of $30 is applied and the total amount payable is $124. Other variations are possible, and other offers are possible, such as free shipping, buy one get one free, etc.

In some embodiments, a SKU number of the product is also utilized as part of the trigger. In this example, the item has a SKU of 6427709. In some embodiments, the audience list may be coupled to particular SKU items such that the coupon or offer is automatically launched only when a matching SKU or SKU range is identified in the shopping cart or a browsing session.

In some embodiments, the coupons and/or offers are pre-populated into the user's wallet, for example in a myOffers data structure. This can occur, for example, through the audience list being utilized to batch push offers and coupons directly into consenting users' wallets to be pre-loaded. When the user calls up his/her digital wallet, the offers or coupons 1606, 1608, can be surfaced to indicate their availability for future purchases.

A benefit of the approach shown in FIGS. 15A, 15B, 15C and FIGS. 16A, 16B, 16C, and 16D is that the coupons and offer provisioning can be separate temporally such that a coupon or offer is saved in a digital wallet for later usage. Accordingly, the coupon or offer provides another avenue for retainers or merchants generate audiences to see their products, and to aid in reducing digital shopping cart abandonment as products are being researched. As the offers and coupons persist as data objects stored thereon the digital wallet, a user does not have to remember which offers or coupons were clipped before, and in the embodiments where the offers or coupons are automatically applied through an interjected checkout process through messaging with the issuer to accommodate the payment, the offer or coupon can be applied automatically without computationally expensive batch post-processing (e.g., as required for statement credits).

Another benefit of this approach is that there can be coordination without cooperation by merchants and retailers such that overlapping promotions are not permissible. In certain situations, a user may be incentivized by more than one marketing campaign, and the user may otherwise be able to combine or "stack" a number of offers or coupons together. In some embodiments described herein, additional business logic may be implemented in the form of rules that limit these capabilities as they can also be processed together when the issuer updates the payment. For example, a user currently may attempt to stack an affiliate marketing link discount (e.g., using a tracked shopping cart registered to a link), combine that with a promotional code entered at checkout, and further combine the checkout with incentive programs (e.g., statement credits) from the issuer/financial institutions. As a result of the lack of coordination between the incentivizing organizations, the user may be able to obtain a product at a cost lower than the actual cost by the retailer to deliver the product.

Figure 17:
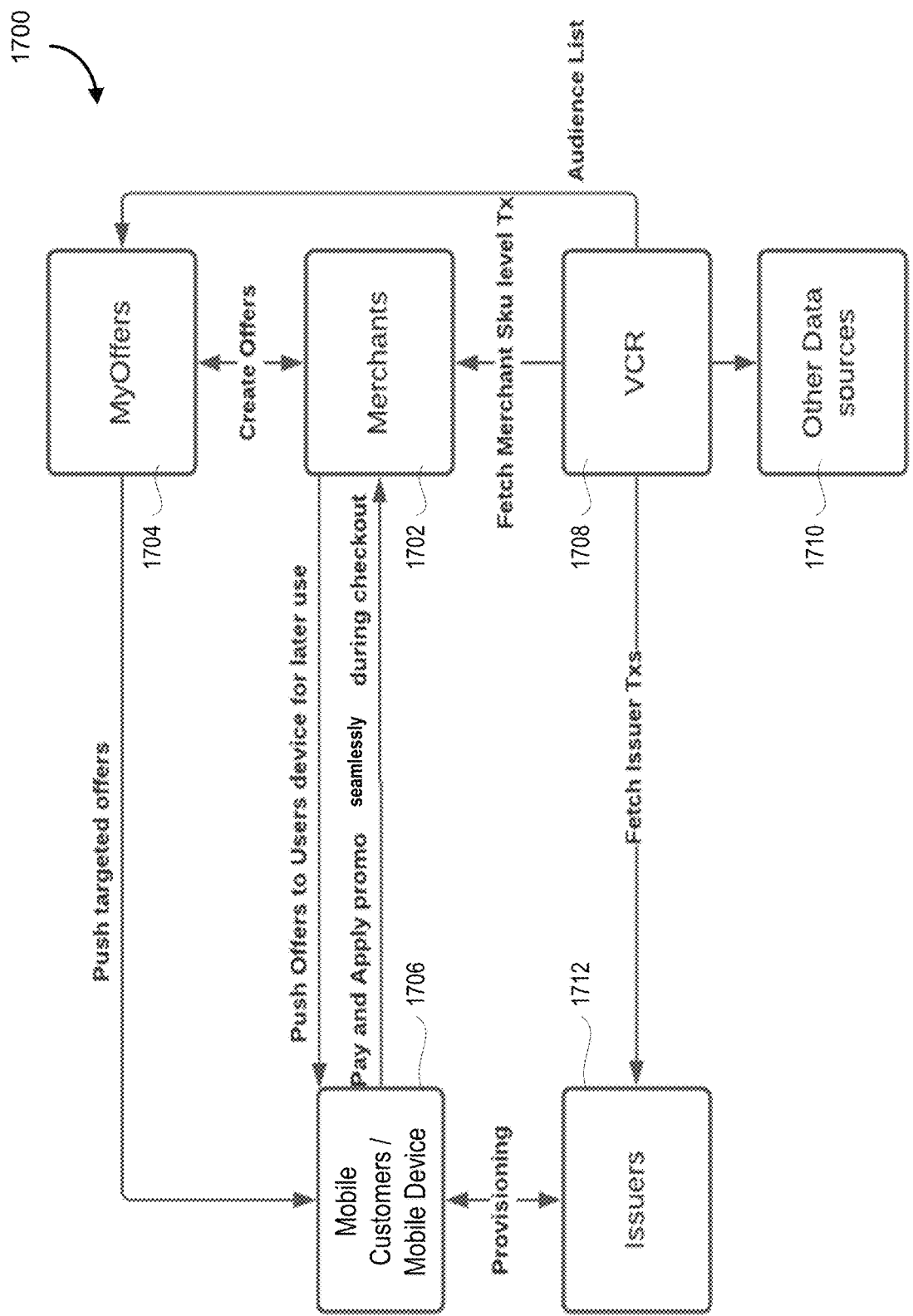
FIG. 17 and FIG. 18, are example systems architectures of a system utilizing a trusted execution environment, according to some embodiments.
Figure 18:
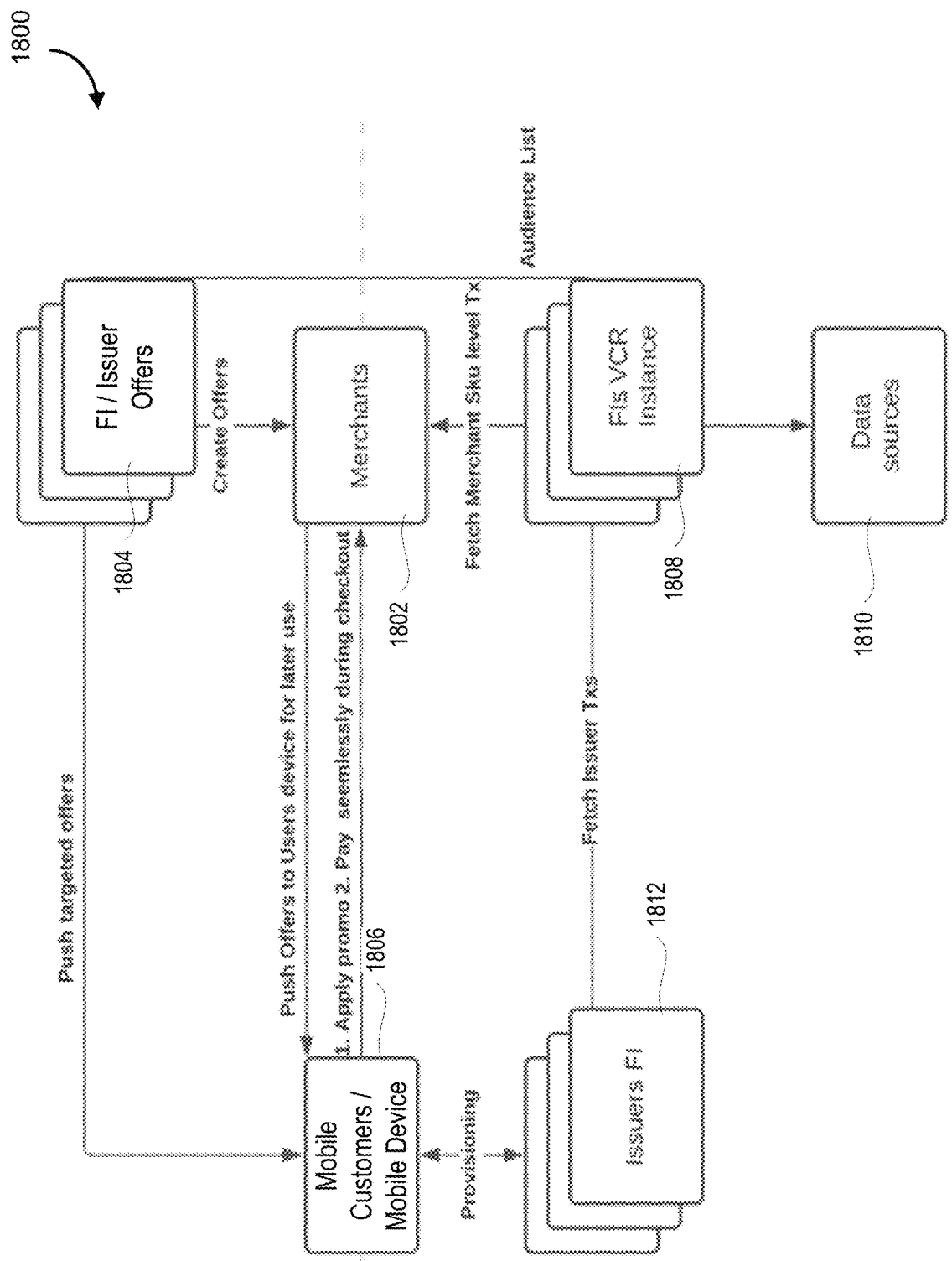

In FIG. 17 and FIG. 18, example systems 1700 and 1800 are shown as example systems architectures, according to some embodiments. Each of the blocks shown are computing systems associated with corresponding parties, such as computer servers, distributed resources computing implementations, among others. Relative to FIG. 17, FIG. 18 is a more complex implementation where there are potentially multiple financial institutions acting as issuers that each have their own trusted execution environment instances that interoperate with one another to provide a consolidated data storage for aggregated data queries.

Merchant systems 1702, 1802 are configured to provide catalogues each having data objects corresponding to products or services available, which can be identified, for example, through merchant specific or global stock keeping unit (SKU) identifiers.

One or more marketing campaigns may be instantiated through an offer or coupon engine 1704, 1804, which can be configured to automatically operate one or more marketing campaigns through implementing logical rules corresponding to eligibility criteria associated with the one or more marketing campaigns. Logical rules can include, for example, requires registration, be automatically or passively pushed, identification of specific demographics (e.g., student discounts) or loyalty program attributes, durations of time in which an offer or coupon is valid. In some embodiments, eligibility can be determined through more granular analyses, such as a machine learning engine adapted to conduct queries and trained with outcome information to predict which users are likely to flip to purchasing an object instead of abandoning a shopping cart after an incentive is provisioned. In some embodiments, the machine learning engine can also be adapted to dynamically determine the size or quantity of a promotion, offer, or coupon (e.g., 20% for users in Group A, and 25% for users in Group B).

The offer or coupon engine 1704, 1804 in some embodiments is configured for interoperation with mobile devices 1706, 1806 such that the offers or coupons can be digitally stored thereon in a digital wallet associated with the user. In some embodiments, the digital wallet is maintained on encrypted local storage on the mobile device 1706, 1806, for example, on a secure element, secure processor, or secure memory region on the mobile device 1706, 1806.

A trusted execution environment 1708 or 1808 is provided that is a "virtual clean room" (VCR) adapted for secure data processing and queries to enhance privacy and security for the one or more users, or with data from one or more retailers or financial institutions, using an always protected database. The offer or coupon engine 1704, 1804 can be configured to interoperate with the trusted execution environment 1708 or 1808 through the sending of data query messages or request messages thereof that can be utilized for the identification of demographics for provisioning of the coupons or offers. In some embodiments, the trusted execution environment 1708 or 1808 holds sensitive data loaded thereon by a plurality of different entities, and the trusted execution environment 1708 or 1808 is conducted to conduct secure queries of the data stored thereon, either in response to specific queries sent by external computing devices or for training machine learning models that can be stored thereon.

In some embodiments, the trusted execution environment 1708 or 1808 securely retains data (e.g., in accordance with a data custodian data process) in an always protected database that utilizes encryption approaches to ensure that data access is closely limited and monitored, such that the trusted execution environment 1708 or 1808 is an isolated computational data processing system whose data cannot be directly accessed by external computational systems unless logical rules enforced by the data custodian data process are adhered to (e.g., user full names and precise locations cannot be directly returned in a query). During the data load process, users or entities may establish data access permission, and the permissions may be implemented through one or more encryption keys that are maintained by these parties and provided if enhanced access is to be provided, for example. Differing layers of encryption may be established through the use of cascaded encryption, and users or other data sources may also provide access at different levels through the provisioning of a corresponding encryption key.

In operation, the trusted execution environment 1708, 1808 may be configured to fetch merchant SKU information from merchant computing systems 1702, 1802, and audience list characteristics from coupon and offer engine 1704, 1804, such that audience characteristics and eligibility queries can be conducted within the trusted execution environment 1708. 1808, for example, tracking the loading and registration of offers and coupons, among others.

When the user, for example, through the user's mobile device 1706, 1806, finalizes a transaction and controls the mobile device 1706, 1806 to initiate a payment through accessing the user's digital wallet, the transaction may be transmitted to issuer computing systems 1712, 1812, which then may send transaction characteristics to be loaded on and/or validated against the records stored thereon in trusted execution environment 1708, 1808. The trusted execution environment 1708, 1808 can be queried, for example, utilizing an encryption key stored thereon on the mobile device 1706, 1806 in conjunction with an encryption key stored on a merchant device or issuer devices to determine whether the offer or coupon can be applied, and upon successful validation, the offer or coupon can be applied, for example, through modifying a price associated with a transaction.

Accordingly, the offer or coupon can be applied without leakage of customer information that occurs in alternate approaches, such as shopping cart/affiliate tracking, among others. Furthermore, parties that do not trust the data security of another can also collaborate in conducting targeted marketing campaigns and overlap between campaigns can be resolved and/or mitigated. The approach herein can be adapted to protect privacy and confidentiality, while providing capabilities for hyper personalization and dynamic provisioning. As described herein, the transactional flows can be adapted for contextual awareness in applicability of offers and coupons, and rules may be implemented to conduct offers and coupons across merchants, for example, and the offers and coupons may automatically trigger without the user selecting it or automatically bringing it up for a real-time redemption.

The use of the trusted execution environment 1708, 1808 enables enhanced privacy through providing an interface (e.g., coupled to a software development kit) where the merchants are unable to access identifying information of the users having information maintained in the trusted execution environment 1708, 1808.

Referring back to FIG. 17, a practical example is described below. In this example, a computer system is provided that is adapted for controlling a user interface for rendering of interactive graphical control elements representing offers or coupons. The system injects or inserts these offers or coupons into a computational payment process, which can include a checkout transaction, a digital wallet, among others.

In this practical example, a company seeks to initiate a new marketing campaign. The company's advertising specialist launches a campaign management application, which is coupled to the computer system through an API or a graphical user interface. The advertising specialist crafts a campaign, and identifiers a set of logical conditions for including a subset of all users as members of a target audience list. Aside from marketing/advertising campaigns, other types of campaigns are possible, such as research campaigns, information awareness campaigns, voting campaigns (e.g., "get out the vote"), etc. For example, the system can be utilized to generate an awareness campaign for a certain type of disease, to identify individuals potentially impacted by routine vehicle recalls, among others.

The set of logical conditions depend from campaign to campaign, and in some cases, multiple sets of logical conditions are provided to the system for processing, as some of the sets of logical conditions represent different variations on offers and coupons being provided, or test queries used to determine parameters for the campaign itself.

These logical conditions require analysis across a set of data sets and data tables that are associated with different entities, each having different underlying privacy requirements. A benefit of the system as described in various embodiments herein is that the system is adapted for an open data sharing approach where parties that do not necessarily trust each other or the security and privacy policies of one another, but share a trust in the always protected system are able to collaborate together. While on one hand, the system can be adapted for an openness of use, on the other hand, the system is designed to be closed from a processing perspective such that privacy and other security features can be automatically enforced by the always protected database.

Accordingly, there can be many different entities entering information or making information available to the always protected database during various data ingestion steps that could be asynchronous with one another.

These could for example, include data sets fed into the always protected database from a payment/digital wallet company providing, for example, for each user, a digital Wallet ID, a list of payment cards available on the digital wallet, an account identifier, a payment card product name, payment specific information such as masked funding primary account number (FPAN) and device primary account number (DPAN), usage history: tap/in-app; amount; timestamp; merchant info, among others.

Merchant data sets can include merchant loyalty program information, merchant SKU products and classifications, product types, among others.

Financial institutions may also contribute or make available data sets associated with the user's accounts with the financial institutions, and in some embodiments, the financial institutions may take extra security precautions to flag sensitive data and further restrict direct access without consent. The information in these data sets can further include whether the user is signed up for various financial institution products, such as mobile applications, mobile banking, rewards, among others, and these may be identified, for example, using unique identifiers for various mobile applications, etc.

The financial institution may also provide information associated with the user, such as the FPAN of payment cards if available, DPAN and Wallet IDs, card usage details, and, in some embodiments, a clientSurrogateID. A DPAN can be a digital network token that is generated by a payment network and may be a tokenized version of a substitute of a card that may only be validly used in certain circumstances (e.g., from the particular device it is bound to, for example, using a cryptogram).

Another example data source could include schools providing enrollment information data tables, grade scores, participation in extra curricular activities. Other example data sources include insurance company data (e.g., claims history, accident history), government data, tax data, web browser/search firm data, among others.

To process the marketing campaign query message request, the always protected database system initiates a data load of the corresponding data.

In a first example, the campaign is for sending out offers and coupons to individuals who are interested in buying headphones and will potentially become long term buys of a particular brand's audiophile headphones. However, the headphone company only has a limited number of coupons and offers available (e.g., 1000), and uses the system to submit a request to aid in their targeting of the coupons and offers. The query request message in this example is adapted for indicating the characteristics of types of customers of interest (e.g., University students in a STEM program, profile indicating interest in audio devices, having an age of 18-24, having abandoned shopping carts in the past with audio devices in them, living in a post code). These are converted into a set of logical conditions, based on the specific schema used in the data fields and data tables of the system. For example, the conditions could include booleanIsStudent=true, student program=engineering OR computer science, booleanPreviousBuyingAttempt=true, among others.

The always protected database system receives campaign request message and optionally first ensures that it adheres to various privacy-enhancing query restrictions. In some embodiments, the query is a pre-approved template query and thus a validation is not necessary. The always protected database system then identifies and loads the relevant database tables and conducts a query across multiple database tables—e.g., University, search engine, online shopping cart program, insurance, merchant. Two or more data tables can be loaded. For example, twelve insurance companies may use the always protected database to combine their data sets to aid a university researcher in assessing long-term flood risks in a flood prone region.

In this example, the number of offers and coupons are limited, so the campaign manager may first run a query to identify how many users would fall into the conditions, identifying the size of a potential audience. Multiple queries may be run to obtain various results.

When the campaign manager is satisfied that a reasonable number of results are generated, the campaign manager can send in a query request configured to generate the audience list, a data structure listing out the particular records to be flagged. In this example, the audience list lists out users meeting the criteria, and in some embodiments, if there are more users than available customers or offers. The audience list can also include SKUs of interest, or merchants of interest that can be incorporated into selecting which offers or coupons are provided to the user.

In this example, an offer or coupon can be digitally provisioned by either sending to the targeted user for later usage (e.g., when the target user looks at the wallet and sees $50 off PX7 headphones), or (2) surfaced to the target user when the user is buying products on at Merchant 1 ($50 off PX7 headphones). If the user's purchase includes the SKU of interest, the coupon/offer is applied, and whether the target users takes up/does not take up the offer can be tracked so that the campaign manager can observe offer/coupon fulfillment rates.

There are differing approaches for technical implementation, and these approaches can include processing the query message at time of campaign instantiation—e.g., when starting campaign, the campaign manager knows that the manager is sending out 10,000 offers because there are 10,000 eligible people. In another variation, the query message can be conducted based on triggers (e.g., time of offer surfacing)—this is a more flexible approach—e.g., when the campaign manager starts campaign, a query is established but processed only periodically on a triggering event, such as when the target user searches multiple times and ultimately abandons carts in the past, but now has a cart with the item in it.

In a second example, the campaign goal is to improve a usage of a particular payment card that is a new offering, so that users can become more familiar with the benefits of the payment card. A campaign is launched, and a campaign data process is initiated. The motivation of the campaign may be to encourage more usage of the card or a switching of the card.

In this example, there are two parties who seek to collaborate across the system, and who will load their data into the always protected database together. The two parties in this example are (1) a financial institution and a (2) mobile payment and digital wallet service. Each has their own data tables including customer information.

The financial institution may be the party seeking to encourage more usage of the card or a switching of the card, and in this example, the financial institution initiates a new campaign utilizing the system to conduct various processing across both data tables to improve or append new additional information to the data table of the financial institution.

In this example, when the financial institution's mobile application is installed on a smartphone, a unique identifier for the installation is generated. The mobile payment and digital wallet service may also have access to this unique identifier for the installation where the mobile payment and digital wallet service is also coupled to an application store, and use this information as a primary key for identifying a particular user. Other primary keys can be used across the various data tables, such as a wallet identifier, a client number (or a surrogate thereof) a phone number, an email, etc.

The always protected database is loaded with the corresponding tables. Initially, the financial institution's data table may include, in a simplified example:

| Name | WalletID | IdentifierforVendor (mobile application identifier) | Has financial institution credit card? | Net-worth Level | Offer |
|---|---|---|---|---|---|
| Arnold | 49a30d03c669a09f2 c0lc3655032af3e | e04049574c7030fe58 74e4719807be4d | Yes | NULL | NULL |
| Steve | NULL | 81b8a1b77068d06e1 c8190825253066f | No | NULL | NULL |
| Ravi | 63dd3e154ca6d948f c380fa576343ba6 | a3de90c0d6a5ec7d d82a779958d76a1c | Yes | NULL | NULL |
| John | NULL | 92a18b50613f3ebf0 5a5f57524c6e9a5 | Yes | NULL | NULL |

In this example, both tables are loaded into the always protected database.

The mobile payment and digital wallet service could have data associated with the various mobile application numbers or Wallet IDs, such as payment data, tracked usage data of near-field data communications payments, application installation unique identifiers, among others, along with digital wallet information.

In this example, for a user such as Arnold, the WalletID matches, and can be used as a primary key to identifying Arnold for analysis. Arnold may have both financial institution and other payment cards, and an automated analysis (e.g., using count comparisons) of the mobile payment and digital wallet service data table indicates that the count of transactions on the non-financial institution payment card is greater than those on the financial institution payment card. To incentivize this particular user, the set of logical conditions can include providing an offer sign-up bonus of $25-$100 (depending on usage/profile) for upgrading the payment card type to a more premium payment card type.

A second set of query messages can be used to identify clients such as Steve which have the mobile application on their device but not the financial institution payment card, and are using a non-financial institution payment card. Because Steve does not use a digital wallet, there may be no walletID to match and the primary key may need to use a secondary primary key, such as the IdentifierforVendor. Steve may also not have a financial institution payment card provisioned, and may be using an alternate card. For Steve, the system instead adds Steve to an audience list data structure for an offering of a pre-approved credit card, as this offer may be better tuned for Steve.

A third set of query messages can be used in respect of the example for Ravi. The query message can identify users across the two data tables such as Ravi who have the financial institution payment card but uses an alternate payment card on the digital wallet, and uses the financial institution payment card only for purchases at a petrol station. For Ravi, the system may be configured to add Ravi to an audience list for generating offers for variable sign-up bonuses.

A fourth set of query messages can be used in respect of the example for John. In this example, John has a financial institution payment card but is not an active digital wallet user. However, in the data table for the mobile payment and digital wallet service, John is a user who uses tap transactions. A query message can be designed around a set of logical conditions, and John can be added to an audience list by the mobile payment and digital wallet service as a user who could benefit from being incentivized by an offer to use a digital wallet service as the high usage of tap transactions indicates a familiarity with technology.

The response from the system could include audience lists for various offers, or control messages to control messaging using the audience lists (e.g., in the embodiment where the audience lists are not provided to the merchants or the parties directly but only maintained on the always protected database).

As described above, the primary key used to associate the records on the data tables may not always be the same and can vary depending on the information available, as records may be sparse or inconsistent. In some embodiments, an approach can instead be used for best efforts matching instead of exact matches to establish a primary key if none is available. This is useful where a high level of accuracy is not required.

As noted above, the system can be useful both ways for the financial institution and the mobile payment and digital wallet service, as they are both able to benefit from the analysis on the combined data tables but do not need to yield any customer privacy or security concerns as data is not being directly provided to the counterparty. In some embodiments, the usage of particular data tables is tracked and associated with a compensation mechanism where usage imbalances are tracked and differentials can be associated with a payment. For example, in a simplified embodiment, every time a data table is requested from Merchant1 for analysis, funds can be provided by other parties, and Merchant1 could distribute the funds among the users whose data is in the data table of Merchant1.

In another embodiment, instead of, or in addition to, generating audience lists for various campaigns, the response to the query message can include updates to a data table for a particular party. In the example above, queries can be run across the combined data table to update a net worth status for each of the users based upon, but without exposing any underlying transaction data captured in the mobile payment and digital wallet service data table. For example a simplified example could be based on average monthly spend, and each of the users can be classified as a high, medium, or low monthly spend customer, which could be useful information for the financial institution for further analysis.

This information can be appended to the data table:

| Name | WalletID | IdentifierforVendor (mobile identifier) | Has application financial institution credit card? | Monthly Spend | Offer |
|---|---|---|---|---|---|
| Arnold | 49a30d03c669a09f2c01c3655032af3e | e04049574c7030fe5874e4719807be4d | Yes | Medium | Sign up bonus $25 |
| Steve | NULL | 81b8a1b77068d06e1c8190825253066f | No | Medium | Pre-approved credit card |
| Ravi | 63dd3e154ca6d948fc380fa576343ba6 | a3de90c0d6a5ec7dd82a779958d76a1c | Yes | High bonus $100 | Sign up |
| John | NULL | 92a18b50613f3ebf05a5f57524c6e9a5 | Yes | Low | $5 off next 5 wallet transactions |

More complex variations are possible. For example, for every user identified on an audience list, an additional field may include a most popular category or type of transaction as obtained from the mobile payment and digital wallet service data table, and offers in the campaign can further be configured to be automatically selected to match the category. For example, instead of offering cash back, an offer may be associated with movie tickets for a user who frequents cinemas, among others. In a further variation, additional data tables may be loaded to allow for dynamically selected offers based on existing inventory levels, etc. For example, for a merchant check-out offer, instead of a cashback offer, the offer may be substituted for products indicated by a merchant as over-stock, clearance, among others (instead of $5 off, the user is offered a free cordless drill instead).

Other information may be appended, such as social classifications of users, most popular categories of installed applications, among others.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A computer system for controlling a user interface for rendering of interactive graphical control elements representing promotional offers or coupons that are inserted into a computational payment process, the computer system comprising:

a processor operating in conjunction with computer memory and storing data on a non-transitory computer readable storage medium, the processor configured to:

receive, through a network from a campaign management computing device associated with a merchant or an advertiser, a query message request representing a set of logical conditions to be satisfied to establish eligibility for one or more promotional offerings, each logical condition of the set of logical conditions representing a user characteristic;

receive, at least two data tables of a plurality of data tables associated with at least two different data sources or entities, each data table of the plurality of data tables including at least a field representing unique customer identifiers used as a primary key for identifying a user across the plurality of data tables, a first corresponding field representing the user characteristic for each unique customer identifier of the unique customer identifiers, and a second corresponding field representing a consent field for each unique customer identifier of the unique customer identifiers;

aggregate, the at least two data tables of the plurality of data tables together for cross-table analysis, wherein the aggregated at least two data tables of the plurality of data tables is not disclosed to the merchant or the advertiser;

in response to receiving the query message request, generate an audience list representing one or more users within the aggregated at least two data tables satisfying the set of logical conditions;

validate or compare the query message request in accordance with or for adherence to one or more privacy policy requirements by validating the query message request against the second corresponding field representing the consent field of the one or more users in the audience list and modifying the audience list in adherence to the one or more privacy policy requirements without use of cookies on a webpage or computing device;

transmit modified results of the query message request to the campaign management computing device related to the audience list in accordance with or in adherence to the one or more privacy policy requirements; and in response to a detected triggering event associated with a user in the modified audience list, transmit, across the network to a computing device corresponding to the user, one or more promotional offers or coupons of the promotional offers or coupons in accordance or in adherence with the privacy policy requirements.

2. The computer system of claim 1, wherein the set of logical conditions includes a threshold score established through a plurality of weighted logical conditions to be met, and wherein the campaign management computing device is not provided individual scores contributing to the threshold score.

3. The computer system of claim 1, wherein the audience list is maintained on an always protected database system encrypted using one or more encryption keys and configured for interaction through a limited application programming interface having sole access to the one or more encryption keys, and the campaign management computing device does not have direct access to the audience list or the aggregated data tables.

4. The computer system of claim 1, wherein the at least two data tables of the plurality of data tables is joined together in a temporal aggregate data table for processing the query message request, and the temporal aggregate data table is discarded after processing the query message request.

5. The computer system of claim 1, wherein the query message request is communicated by the campaign management computing device along with a consent data structure representing consent tokens provided by at least one of a user or data sources corresponding to the plurality of data tables to be aggregated, and wherein the validation of the query message request in accordance with or for adherence to one or more privacy policy requirements includes validating the consent data structure.

6. The computer system of claim 5, wherein the consent data structure includes cryptographic keys, each corresponding to at least one of the at least one of a user or data sources corresponding to the plurality of data tables to be aggregated, and each of the cryptographic keys are validated against a corresponding cryptographic key validation portion stored on or accessible by the always protected database system.

7. The computer system of claim 1, wherein the triggering event is a determination that the user interface conducting the computational payment process has shifted into a browsing state, a checkout state, or payment state.

8. The computer system of claim 1, wherein the triggering event is a determination that the user interface conducting the computational payment process has triggered a loading of a digital wallet widget.

9. The computer system of claim 7, wherein the triggering event further includes a second determination that the browsing state, the checkout state, or the payment state is associated with a product code identifier corresponding to a product type or specific product identified in a logical condition of the set of logical conditions.

10. The computer system of claim 1, wherein the computer system is a computing server appliance residing within a data center, the computing server appliance connected through a message bus to receive the query message request across flail network from the campaign management computing device coupled through an interface.

11. A computer method for controlling a user interface for rendering of interactive graphical control elements representing offers or coupons that are inserted into a computational payment process, the computer method comprising:

receiving, by a processor of a computer system, from a campaign management computing device associated with a merchant or an advertiser through a network, a query message request representing a set of logical conditions to be satisfied to establish eligibility for one or more promotional offerings, each logical condition of the set of logical conditions representing a user characteristic;

receiving, by the processor of the computer system, at least two data tables of a plurality of data tables associated with at least two different data sources or entities, each data table of the plurality of data tables including at least a field representing unique customer identifiers used as a primary key for identifying a user across the plurality of data tables, a first corresponding field representing the user characteristic for each unique customer identifier of the unique customer identifiers, and a second corresponding field representing a consent field for each unique customer identifier of the unique customer identifiers;

aggregating, by the processor of the computer system, the at least two data tables of the plurality of data tables together for cross-table analysis, wherein the aggregated at least two data tables of the plurality of data tables is not disclosed to the merchant or advertiser;

in response to receiving the query message request, generating an audience list representing one or more users within the aggregated at least two data tables satisfying the set of logical conditions;

validating or comparing, by the processor of the computer system, the query message request in accordance with or for adherence to one or more privacy policy requirements by validating the query message request against the second corresponding field representing the consent field of the one or more users in the audience list without use of cookies on a webpage or computing device;

transmitting, by the processor of the computer system, modified results of the query message request to the campaign management computing device related to the audience list, modified in accordance to adherence to the privacy policy requirements; and in response to a detected triggering event associated with a user in the modified audience list, transmitting to a computing device corresponding to the user across the network, by the processor of the computer system, one or more promotional offers or coupons in accordance with or in adherence to the privacy policy requirements.

12. The computer method of claim 11, wherein the set of logical conditions includes a threshold score established through a plurality of weighted logical conditions to be met, and wherein the campaign management computing device is not provided individual scores contributing to the threshold score.

13. The computer method of claim 11, wherein the audience list is maintained on an always protected database system encrypted using one or more encryption keys and configured for interaction through a limited application programming interface having sole access to the one or more encryption keys and the campaign management computing device does not have direct access to the audience list or the aggregated data tables.

14. The computer method of claim 11, wherein the at least two data tables of the plurality of data tables is joined together in a temporal aggregate data table for processing the query message request, and the temporal aggregate data table is discarded after processing the query message request.

15. The computer method of claim 11, wherein the query message request is communicated by the campaign management computing device along with a consent data structure representing consent tokens provided by at least one of a user or data sources corresponding to the plurality of data tables to be aggregated, and wherein the validation of the query message request in accordance with or for adherence to one or more privacy policy requirements includes validating the consent data structure.

16. The computer method of claim 15, wherein the consent data structure includes cryptographic keys, each corresponding to at least one of the at least one of a user or data sources corresponding to the plurality of data tables to be aggregated, and each of the cryptographic keys are validated against a corresponding cryptographic key validation portion stored on or accessible by an always protected database system.

17. The computer method of claim 11, wherein the triggering event is a determination that the user interface has shifted into a browsing state, a checkout state, or payment state.

18. The computer method of claim 11, wherein the triggering event is a determination that the user interface has triggered a loading of a digital wallet widget.

19. The computer method of claim 17, wherein the triggering event further includes a second determination that the browsing state, the checkout state, or the payment state is associated with a product code identifier corresponding to a product type or specific product identified in a logical condition of the set of logical conditions.

20. A non-transitory computer readable medium storing machine interpretable instruction sets, which when executed by a processor, cause the processor to perform a method for inserting offers or coupons into a computational purchase process, the method comprising:

receiving, by a processor of a computer system, from a campaign management computing device associated with a merchant or an advertiser through a network, a query message request representing a set of logical conditions to be satisfied to establish eligibility for one or more promotional offerings, each logical condition of the set of logical conditions representing a user characteristic;

receiving, by the processor of the computer system, at least two data tables of a plurality of data tables associated with at least two different data sources or entities, each data table of the plurality of data tables including at least a field representing unique customer identifiers used as a primary key for identifying a user across the plurality of data tables, a first corresponding field representing the user characteristic for each unique customer identifier of the unique customer identifiers, and a second corresponding field representing a consent field for each unique customer identifier of the unique customer identifiers;

aggregating, by the processor of the computer system, the at least two data tables of the plurality of data tables together for cross-table analysis, wherein the aggregated at least two data tables of the plurality of data tables is not disclosed to the merchant or advertiser;

in response to receiving the query message request, generating an audience list representing one or more users within the aggregated at least two data tables satisfying the set of logical conditions;

validating or comparing, by the processor of the computer system, the query message request in accordance with or for adherence to one or more privacy policy requirements by validating the query message request against the second corresponding field representing the consent field of the one or more users in the audience list without use of cookies on a webpage or computing device;

transmitting, by the processor of the computer system, modified results of the query message request to the campaign management computing device related to the audience list, modified in accordance to adherence to the privacy policy requirements;

and in response to a detected triggering event associated with a user in the modified audience list, transmitting to a computing device corresponding to the user across the network, by the processor of the computer system, one or more promotional offers or coupons in accordance with or in adherence to the privacy policy requirements.

* * * * *